US011536184B2

(12) United States Patent
Shimizu et al.

(10) Patent No.: US 11,536,184 B2
(45) Date of Patent: Dec. 27, 2022

(54) CATALYST DEGRADATION DETERMINING DEVICE FOR STRADDLED VEHICLE AND STRADDLED VEHICLE INCLUDING SAME

(71) Applicant: YAMAHA HATSUDOKI KABUSHIKI KAISHA, Iwata (JP)

(72) Inventors: Yuta Shimizu, Shizuoka (JP); Ryo Tomii, Shizuoka (JP); Tatsuya Aoyama, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/590,346

(22) Filed: Feb. 1, 2022

(65) Prior Publication Data
US 2022/0251995 A1    Aug. 11, 2022

(30) Foreign Application Priority Data
Feb. 5, 2021    (JP) .............................. JP2021-017727

(51) Int. Cl.
  *F01N 11/00*    (2006.01)
(52) U.S. Cl.
  CPC .......... *F01N 11/00* (2013.01); *F01N 2550/02* (2013.01); *F01N 2590/04* (2013.01); *F01N 2900/08* (2013.01); *F01N 2900/10* (2013.01)
(58) Field of Classification Search
  CPC combination set(s) only.
  See application file for complete search history.

(56) References Cited

U.S. PATENT DOCUMENTS

| 5,916,130 A * | 6/1999 | Nakae | ................... B60W 20/50 |
| | | | 903/910 |
| 2011/0155100 A1* | 6/2011 | Matsuda | ................ B60K 28/16 |
| | | | 701/99 |

(Continued)

FOREIGN PATENT DOCUMENTS

| EP | 2868958 A1 | 5/2015 |
| EP | 3276137 A1 | 1/2018 |

(Continued)

OTHER PUBLICATIONS

"The 2009 Supersport Model YZF-R1", Toyoshi Nishida, Hideki Fujiwara, Yuichi Takeda, Takashi Watanabe, Kazuya Kamada, Mitsuhiro Suzuki, Hidenori Akatsuka, Yamaha Motor Technical Review, 2009.

(Continued)

*Primary Examiner* — Binh Q Tran
(74) *Attorney, Agent, or Firm* — Rabin & Berdo, P.C.

(57) ABSTRACT

A catalyst deterioration determining device for use in a straddled vehicle having an engine, a transmission that transmits motive power of an engine, and a catalyst that cleans an exhaust gas from the engine. The catalyst deterioration determining device includes a running state acquirer that acquires a plurality of running states, a state determiner that stores a plurality of allowable conditions, each of which is a condition for determining work in regard to a degradation state of the catalyst to be executed and is based on a relationship among a plurality of gear ratios of the transmission, an intake state of the engine and a rotation speed of the engine, and determines whether the plurality of running states acquired by the running state acquirer satisfy the plurality of allowable conditions, and a determination executor that executes the determining work based on a result of the determination by the state determiner.

7 Claims, 11 Drawing Sheets

(56) References Cited

U.S. PATENT DOCUMENTS

| | | | | |
|---|---|---|---|---|
| 2012/0166068 | A1* | 6/2012 | Kuratani | F02D 41/149 701/104 |
| 2015/0128572 | A1* | 5/2015 | Fujiwara | F01N 9/00 60/284 |
| 2017/0074191 | A1* | 3/2017 | Kim | F01N 3/2066 |
| 2017/0276103 | A1* | 9/2017 | Yamamoto | F02B 39/16 |
| 2017/0282817 | A1* | 10/2017 | Murase | B60W 50/0205 |
| 2020/0080459 | A1* | 3/2020 | Okamoto | B01D 53/9454 |

FOREIGN PATENT DOCUMENTS

| | | |
|---|---|---|
| EP | 3276138 A1 | 1/2018 |
| EP | 3415731 A1 | 12/2018 |
| JP | H08-144744 A | 6/1996 |
| JP | H08-218851 A | 8/1996 |
| JP | 2006-307797 A | 11/2006 |
| JP | 2010-261385 A | 11/2010 |

OTHER PUBLICATIONS

Extended European Search Report in the counterpart European patent application No. 22154246.7 dated Jun. 20, 2022.

* cited by examiner

GEAR POSITION-TRAVELING SPEED TABLE

| | | \multicolumn{9}{c|}{TRAVELING SPEED (km/h)} | | | | | | | | |
|---|---|---|---|---|---|---|---|---|---|---|
| | | 40~ | 50~ | 60~ | 70~ | 80~ | 90~ | 100~ | 110~ | 120~ |
| GEAR POSITION | FIRST | | | | | | | | | |
| | SECOND | | | | | | | | | |
| | THIRD | ▨ | | | | | | | | |
| | FOURTH | ▨ | ▨ | ▨ | ▨ | | | | | |
| | FIFTH | | ▨ | ▨ | ▨ | | | ▨ | ▨ | |
| | SIXTH | | | ▨ | ▨ | ▨ | ▨ | ▨ | ▨ | ▨ |

INTAKE AMOUNT-ROTATION SPEED TABLE

FIG. 7

FIRST GEAR POSITION-TRAVELING SPEED TABLE

| | | TRAVELING SPEED (km/h) | | | | | | | | |
|---|---|---|---|---|---|---|---|---|---|---|
| | | 40~ | 50~ | 60~ | 70~ | 80~ | 90~ | 100~ | 110~ | 120~ |
| GEAR POSITION | FIRST | | | | | | | | | |
| | SECOND | | | | | | | | | |
| | THIRD | | | | | | | | | |
| | FOURTH | ▨ | | | | | | | | |
| | FIFTH | | ▨ | ▨ | ▨ | | | | | |
| | SIXTH | | | ▨ | ▨ | | | ▨ | ▨ | ▨ |

SECOND GEAR POSITION-TRAVELING SPEED TABLE

| | | TRAVELING SPEED (km/h) | | | | | | | | |
|---|---|---|---|---|---|---|---|---|---|---|
| | | 40~ | 50~ | 60~ | 70~ | 80~ | 90~ | 100~ | 110~ | 120~ |
| GEAR POSITION | FIRST | | | | | | | | | |
| | SECOND | | | | | | | | | |
| | THIRD | ▨ | | | | | | | | |
| | FOURTH | ▨ | ▨ | ▨ | ▨ | | | | | |
| | FIFTH | | ▨ | ▨ | ▨ | | | ▨ | ▨ | |
| | SIXTH | | | ▨ | ▨ | ▨ | ▨ | ▨ | ▨ | ▨ |

THIRD GEAR POSITION-TRAVELING SPEED TABLE

| | | TRAVELING SPEED (km/h) | | | | | | | | |
|---|---|---|---|---|---|---|---|---|---|---|
| | | 40~ | 50~ | 60~ | 70~ | 80~ | 90~ | 100~ | 110~ | 120~ |
| GEAR POSITION | FIRST | | | | | | | | | |
| | SECOND | ▨ | | | | | | | | |
| | THIRD | ▨ | ▨ | ▨ | ▨ | | | | | |
| | FOURTH | ▨ | ▨ | ▨ | ▨ | | | | | |
| | FIFTH | | | ▨ | ▨ | ▨ | ▨ | ▨ | ▨ | ▨ |
| | SIXTH | | | ▨ | ▨ | ▨ | ▨ | ▨ | ▨ | ▨ |

CATALYST DEGRADATION DETERMINING DEVICE FOR STRADDLED VEHICLE AND STRADDLED VEHICLE INCLUDING SAME

CROSS REFERENCE TO RELATED APPLICATIONS

This application is based upon and claims the benefit of priority of the prior Japanese Patent Application No. 2021-017727, filed on Feb. 5, 2021, the entire contents of which are incorporated herein by reference.

BACKGROUND

Technical Field

The present invention relates to a catalyst degradation determining device for a straddled vehicle and a straddled vehicle including the catalyst degradation determining device.

Description of Related Art

A catalyst for cleaning gas exhausted from an engine (exhaust gas) is provided in an exhaust system of a vehicle including an engine. Ability of a catalyst to clean an exhaust gas is degraded as the period of use becomes longer. As such, a catalyst degradation determining device that determines degradation of a catalyst is used to identify an appropriate replacement time for the catalyst.

Normally, feedback control is executed to bring the air fuel ratio of an air-fuel mixture supplied to the engine close to a target air-fuel ratio. In the catalyst degradation determining device, with the feedback control for an air-fuel ratio executed, for example, degradation of a catalyst is determined based on an oxygen concentration of an exhaust gas that has yet been cleaned by the catalyst and an oxygen concentration of an exhaust gas that has been cleaned by the catalyst.

As one example of a catalyst degradation determining device for an automobile (Automobile Car), JP H 8-218851 A describes a degradation diagnosis device in which an upstream $O_2$ sensor, a three-way catalyst and a downstream $O_2$ sensor are provided in this order in an exhaust system of an engine.

In the degradation diagnosis device, with the feedback control for the air-fuel ratio of an air-fuel mixture executed, the ratio of an inversion frequency of output of the downstream $O_2$ sensor with respect to an inversion frequency of output of the upstream $O_2$ sensor is calculated as a ratio of inversion frequency. In JP H 8-218851 A, an inversion frequency is the number of times an output voltage of each $O_2$ sensor crosses a predetermined threshold value (0.5 V, for example) in a predetermined period of time (10 seconds, for example). A value of a ratio of inversion frequency changes in accordance with a running state of the engine. As such, in the above-mentioned degradation diagnosis device, a plurality of running regions (a low-speed low-load running region and a high-speed high-load running region) for distinguishing the running states of the engine are set. The plurality of running regions are defined on a map representing the relationship between information about an intake amount per cycle of the engine and an engine rotation speed. Further, degradation of a catalyst is individually determined with use of calculated ratios of inversion frequency that are calculated when the running state is in the low-speed low-load running region or the high-speed high-load running region. Therefore, in a case where the running state switches between the low-speed low-load running region and the high-speed high-load running region when a ratio of inversion frequency is calculated for determination in regard to degradation of a catalyst, it is taken as though the process of calculating a ratio of inversion frequency has not been executed.

SUMMARY

On the other hand, because a power-to-weight ratio of a straddled vehicle is extremely smaller than a power-to-weight ratio of an automobile, a running state of the straddled vehicle is likely to change as compared to a running state of the automobile. Therefore, in a case where the degradation diagnosis device of JP H 8-218851 A is provided in a straddled vehicle, since a running state frequently changes among a plurality of running regions, opportunities to diagnose degradation of a catalyst are likely to be reduced.

During determination in regard to degradation of a catalyst, feedback control suitable for determination in regard to degradation of a catalyst is executed for the air-fuel ratio of an air-fuel mixture. During this feedback control, the engine works differently. As described above, a power-to-weight ratio of the straddled vehicle is small, and the straddled vehicle tilts when turning. Further, in the straddled vehicle, pitching caused by a change in torque of an engine is likely to occur. Therefore, in the straddled vehicle, riding comfort for a rider is likely to change due to a change in work of the engine. Therefore, in consideration of riding comfort for the rider, degradation of a catalyst of the straddled vehicle is desirably determined only in a specific running region. However, limitation of a running region for such determination in regard to degradation of a catalyst further reduces opportunities to determine degradation of a catalyst.

An object of the present invention is to provide a catalyst degradation determining device for a straddled vehicle and a straddled vehicle including the catalyst degradation determining device that can appropriately ensure opportunities to execute degradation determining work in regard to a catalyst while suppressing influence on riding comfort for a rider.

(1) A catalyst deterioration determining device for a straddled vehicle according to one aspect of the present invention used in a straddled vehicle having a transmission that transmits motive power of the engine and a catalyst that cleans an exhaust gas from the engine, includes a running state acquirer that acquires each of a gear ratio of the transmission, an intake state of the engine and a rotation speed of the engine as a running state, a state determiner that stores conditions for a plurality of running states in which execution of determining work in regard to a degradation state of a catalyst is allowed as allowable conditions based on a relationship among a gear ratio of the transmission, an intake state of the engine and a rotation speed of the engine, and determines whether a plurality of running states acquired by the running state acquirer satisfy the allowable conditions, and a determination executor that executes determining work in regard to the degradation state in a case where a plurality of running states acquired by the running state acquirer satisfy the allowable conditions, and does not execute determining work in regard to the degradation state in a case where a plurality of running states acquired by the running state acquirer do not satisfy the allowable conditions.

In the above-mentioned catalyst degradation determining device, allowable conditions are defined based on at least a gear ratio of the transmission. Thus, whether the running state is suitable for determining work in regard to the degradation state of the catalyst can be appropriately determined for each gear ratio settable in the transmission of the straddled vehicle. Therefore, it is possible to appropriately ensure opportunities to execute the determining work in regard to the degradation state of the catalyst while suppressing the influence on riding comfort for a rider.

(2) The running state acquirer may further acquire a traveling speed of the straddled vehicle as a running state, an allowable range of a traveling speed for allowing execution of determining work in regard to a degradation state of the catalyst may be defined to correspond to each of a plurality of gear ratios of the transmission, a relationship between an intake state of the engine and a rotation speed of the engine may be set as an engine state, and an allowable region for allowing execution of determining work in regard to a degradation state of a catalyst may be defined in regard to the engine state, and the state determiner may store an allowable range corresponding to each of a plurality of gear ratios of the transmission and the allowable region as the allowable conditions in advance, may determine that the plurality of running states satisfy the allowable conditions when a traveling speed acquired by the running state acquirer is in an allowable range corresponding to a gear ratio acquired by the running state acquirer and an engine state acquired by the running state acquirer is in the allowable region, may determine that the plurality of running states do not satisfy the allowable conditions when a traveling speed acquired by the running state acquirer is not in an allowable range corresponding to a gear ratio acquired by the running state acquirer, and may determine that the plurality of running states do not satisfy the allowable conditions when an engine state acquired by the running state acquirer is not in the allowable region.

In this case, it is not necessary to define a plurality of allowable regions respectively corresponding to the plurality of gear ratios of the transmission. Thus, even in a case where a large number of settable gear ratios are present in the transmission, an information amount stored in the state determiner can be reduced, and a process of determining whether a plurality of running states satisfy the allowable conditions can be simplified. As a result, because a period of time required for the determination process can be shortened, it is possible to further increase opportunities to execute the determining work in regard to the degradation state of the catalyst while suppressing the influence on riding comfort for a rider.

(3) The allowable range may be defined to increase as a corresponding gear ratio decreases. In this case, frequency of determination in regard to the degradation state of the catalyst increases when the gear position of the transmission is high.

(4) A relationship between an intake state of the engine and a rotation speed of the engine may be set as an engine state, and an allowable region for allowing execution of determining work in regard to a degradation state of a catalyst may be defined to correspond to each of a plurality of gear ratios of the transmission in regard to the engine state, and the state determiner may store an allowable region corresponding to each of a plurality of gear ratios of the transmission as the allowable condition, may determine that the plurality of running states satisfy the allowable conditions when an engine state acquired by the running state acquirer is in an allowable region corresponding to a gear ratio acquired by the running state acquirer, and may determine that the plurality of running states do not satisfy the allowable conditions when the engine state acquired by the running state acquirer is not in an allowable region corresponding to a gear ratio acquired by the running state acquirer.

In this case, because an allowable region is set for each gear ratio of the transmission, whether a running state is suitable for determining work in regard to the degradation state of the catalyst can be more appropriately determined based on each gear ratio of the transmission of the straddled vehicle. Therefore, it is possible to appropriately ensure opportunities to execute the determining work in regard to the degradation state of the catalyst while suppressing the influence on riding comfort for a rider.

(5) The straddled vehicle may be configured to be workable in a first control mode in which an opening of a throttle valve changes with respect to an operation of an accelerator grip with a first responsiveness and a second control mode in which an opening of the throttle valve changes with respect to an operation of the accelerator grip with a second responsiveness lower than the first responsiveness, the allowable conditions may include first and second allowable conditions respectively corresponding to the first and second control modes, and the state determiner may determine whether a plurality of running states acquired by the running state acquirer satisfy the first allowable conditions as the allowable conditions in a case where the straddled vehicle is working in the first control mode, and may determine whether a plurality of running states acquired by the running state acquirer satisfy the second allowable conditions as the allowable conditions in a case where the straddled vehicle is working in the second control mode.

In a case where being set in the first and second control modes of the straddled vehicle, common allowable conditions are limited by the first and second control modes. With the above-mentioned configuration, the first and second allowable conditions respectively corresponding to the first and second control modes of the straddled vehicle are set. Thus, the steerability of the straddled vehicle in accordance with the preference of the rider is realized, and it is possible to appropriately ensure opportunities to execute the determining work in regard to the degradation state of the catalyst while suppressing the influence on riding comfort for the rider.

(6) The catalyst degradation determining device may further include an outputter that outputs a result of determination obtained by execution of the determining work. In this case, a rider or an operator who maintains the straddled vehicle can easily identify the degradation state of the catalyst.

(7) A straddled vehicle according to another aspect of the present invention includes an engine, a transmission that transmits motive power of the engine, a catalyst that cleans an exhaust gas from the engine, and the above-mentioned catalyst degradation determining device.

The straddled vehicle includes the above-mentioned catalyst degradation determining device. Thus, opportunities to execute the determining work in regard to the degradation state of the catalyst are appropriately ensured while the influence on riding comfort of the straddled vehicle for the rider is suppressed.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 7 is a diagram showing one example of first, second and third gear position-traveling speed tables according to the second embodiment;

DETAILED DESCRIPTION

A catalyst degradation determining device for a straddled vehicle and a straddled vehicle including the catalyst degradation determining device according to one embodiment of the present invention will be described below with reference to the drawings. A motorcycle will be described as one example of the straddled vehicle.

1. First Embodiment

[1] Schematic Configuration of Motorcycle

Figure 1:
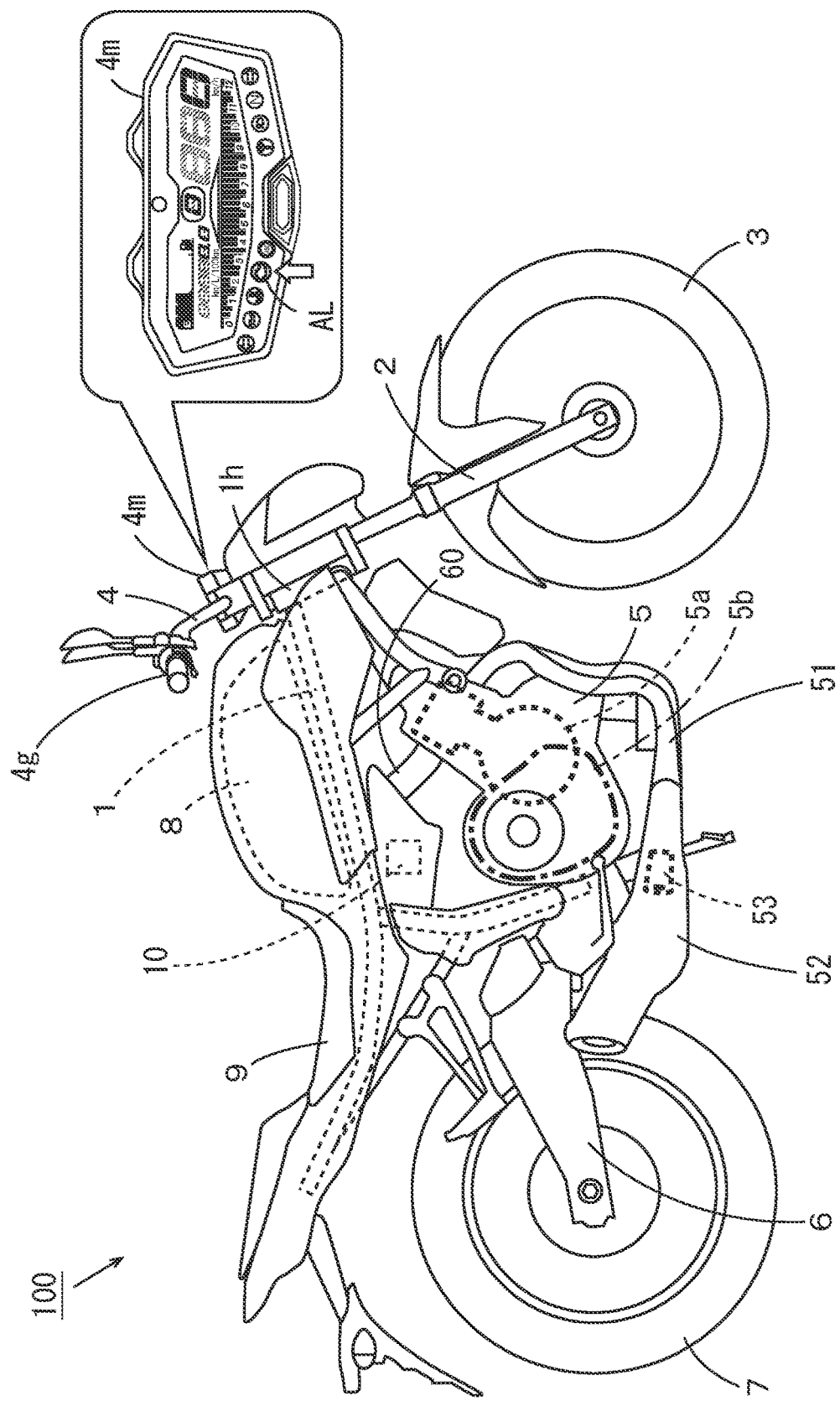
FIG. 1 is a right side view of a motorcycle according to a first embodiment.

FIG. 1 is a right side view of the motorcycle according to the first embodiment. In FIG. 1, the motorcycle 100 standing up to be perpendicular to the road surface is shown. The motorcycle 100 of FIG. 1 includes a metallic body frame 1. The body frame 1 includes a head pipe 1h and a plurality of frame members. The head pipe 1h is located in a front portion of the vehicle, and the plurality of frame members are provided to extend toward a rear portion of the vehicle from the head pipe 1h.

A front fork 2 is provided at the head pipe 1h to be swingable in a left-and-right direction. A front wheel 3 is rotatably supported at the lower end of the front fork 2. A handle 4 and a meter unit 4m are provided at the upper end of the front fork 2. An accelerator grip 4g is provided at the handle 4 to be operable by a rider. As shown in the balloon in FIG. 1, the meter unit 4m has a display (liquid crystal display) that displays a plurality of information pieces such as a speed of vehicle and a remaining amount of fuel. Further, as indicated by the outlined arrow in the balloon of FIG. 1, the meter unit 4m has an alarm light AL for presenting a problem with an engine unit 5 and its accessories to the rider. Problems include degradation of a three-way catalyst 53. Therefore, the alarm light AL according to the present embodiment outputs an alarm in a case where it is determined that the three-way catalyst 53 is degraded in determination of a degradation state of the three-way catalyst 53 by a degradation determiner 15 (FIG. 2), described below. Further, the alarm light AL outputs an alarm when there is a problem with various sensors provided in the engine unit 5 and its accessories, for example.

The body frame 1 supports the engine unit 5 such that the engine unit 5 is located at a position farther downward than the head pipe 1h. Further, the body frame 1 supports a fuel tank 8 such that the fuel tank 8 is located at a position farther upward than the engine unit 5 and farther rearward than the head pipe 1h. Further, the body frame 1 supports a seat 9 such that the seat 9 is located at a position farther rearward than the fuel tank 8.

Figure 2:
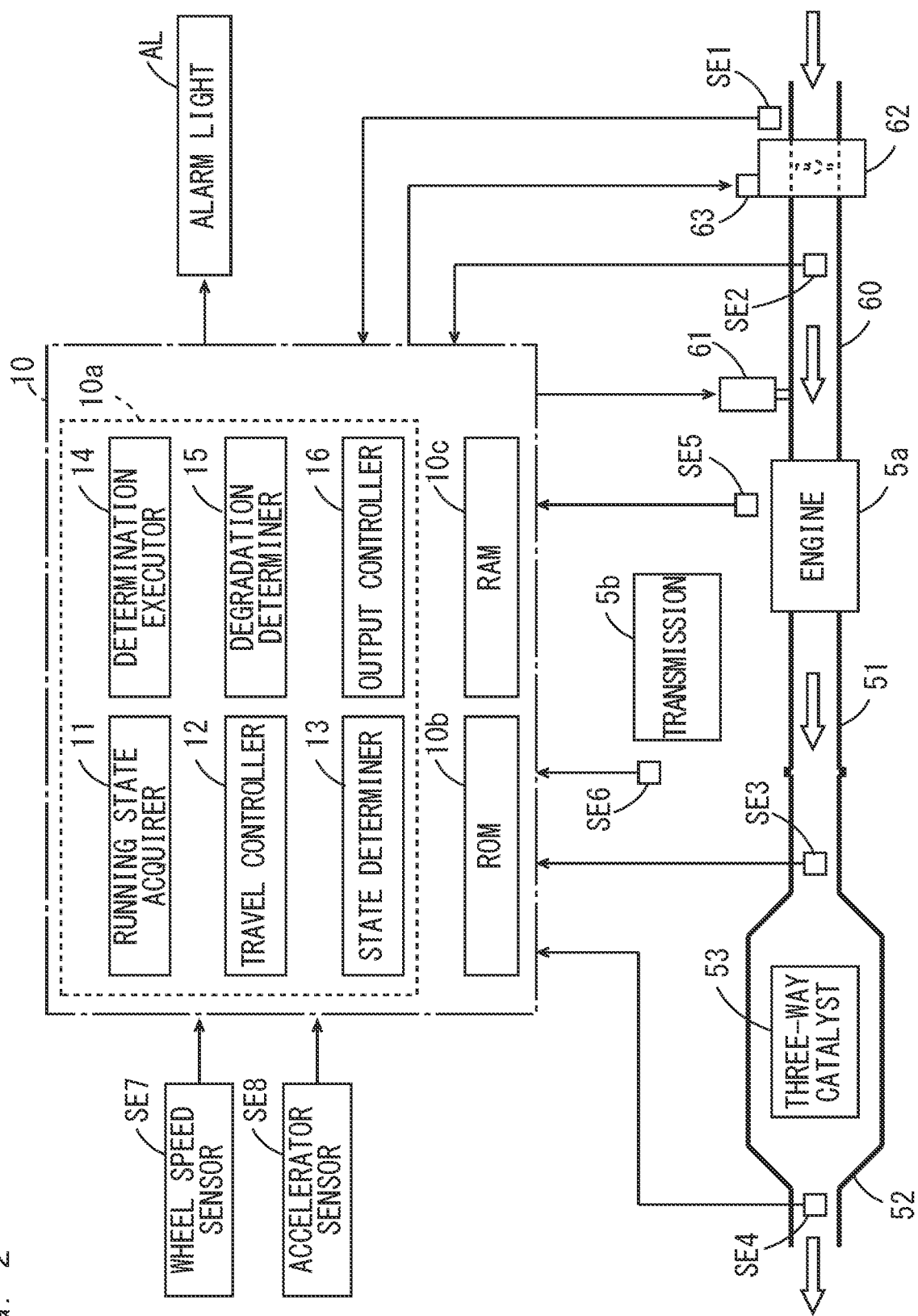
FIG. 2 is a block view showing a control system of the motorcycle according to the first embodiment.

An ECU (Electronic Control Unit) 10 is provided to be surrounded by the engine unit 5, the fuel tank 8 and the seat 9. The ECU 10 includes a CPU (Central Processing Unit) 10a (FIG. 2), a ROM (Read Only Memory) 10b (FIG. 2) and a RAM (Random Access Memory) 10c (FIG. 2). The ROM 10b is made of a non-volatile memory, for example, and stores a system program, a catalyst degradation determining program and so on. The RAM 10c is made of a volatile memory, for example, which is used as a working area for the CPU 10a, and temporarily stores various data. The CPU 10a executes the catalyst degradation determining program stored in the ROM 10b to implement various functions. Details of various functions implemented by the CPU 10a will be described below. The catalyst degradation determining program in the present embodiment may be provided in the form of being stored in a computer-readable recording medium and may be installed in a storage device connectable to the ROM 10b or the ECU 10. Further, in a case where the ECU 10 is connectable to a communication network, the catalyst degradation determining program delivered from a server connected to the communication network may be installed in the ROM 10b or the storage device with the ECU 10 connected to the communication network.

A rear arm 6 is provided to extend rearwardly from a lower portion at the center of the body frame 1 in a front-and-rear direction of the vehicle. The rear arm 6 is supported at the body frame 1 via a pivot shaft (not shown). A rear wheel 7 is rotatably supported at the rear end of the rear arm 6. The rear wheel 7 is rotated as a drive wheel by motive power generated by the engine unit 5.

The engine unit 5 includes an engine 5a and a transmission 5b. In FIG. 1, the engine 5a is indicated by the thick dotted line, and the transmission 5b is indicated by the thick one-dot and dash line. The transmission 5b has a main shaft (input shaft) and a drive shaft (output shaft). The transmission 5b transmits a torque, transmitted to the main shaft from the engine 5a, to the rear wheel 7 via the drive shaft at any gear ratio out of a plurality of predetermined gear ratios (reduction gear ratios).

A shift cam (not shown) is provided in the transmission 5b to be rotatable about a predetermined rotation axis. In the shift cam, a plurality of gear positions respectively corresponding to the plurality of above-mentioned gear ratios are set at a plurality of rotation positions (rotation angles) around the rotation axis. In the present embodiment, a neutral position and first to sixth gear positions are set as the plurality of gear positions. The shift cam is rotated when the rider operates a shift operating element (not shown) (a shift pedal, for example). Thus, the gear position is switched among the neutral position and the first to sixth gear positions. At this time, the transmission 5b transmits a torque at a gear ratio corresponding to a switched gear position. As the plurality of gear positions, a neutral position and first to fifth gear positions may be set. In this case, the gear position is switched among the neutral position and the first to fifth gear positions when the rider operates the shift operating element (not shown).

The engine 5a has an intake port for supplying an air-fuel mixture into a combustion chamber and an exhaust port for exhausting a combusted gas from the combustion chamber. An intake pipe 60 is connected to the intake port of the engine 5a. A fuel injection device 61 (FIG. 2) and a throttle valve 62 (FIG. 2) are provided at the intake pipe 60. One end of an exhaust pipe 51 is connected to the exhaust port of the engine 5a. A muffler 52 is connected to the other end of the exhaust pipe 51. The three-way catalyst 53 is arranged in the muffler 52. The three-way catalyst 53 cleans an exhaust gas from the engine 5a. The three-way catalyst 53 may be provided in the exhaust pipe 51 instead of the muffler 52.

As described in Background Art, the ability of the three-way catalyst 53 to clean an exhaust gas from the engine 5a is degraded as the period of use becomes longer. As such, in the motorcycle 100 of FIG. 1, catalyst degradation determining work for determining the degradation state of the three-way catalyst 53 is executed. In this catalyst degradation determining work, the air-fuel ratio of an air-fuel mixture supplied to the engine 5a is controlled.

In the motorcycle 100 according to the present embodiment, whether a plurality of running states detected by a plurality of sensors (described below) satisfy predetermined allowable conditions is determined. Thus, the catalyst degradation determining work is executed in a case where the plurality of running states satisfy the allowable conditions, and the catalyst degradation determining work is not executed in a case where the plurality of running states do not satisfy the allowable conditions. In the following description, determination of whether a plurality of running states satisfy predetermined allowable conditions is referred to as allowable condition determination.

[2] Control System of Motorcycle 100

FIG. 2 is a block diagram showing a control system of the motorcycle 100 according to the first embodiment. As shown in FIG. 2, the motorcycle 100 according to the first embodiment includes the ECU 10, the fuel injection device 61, a throttle actuator 63, a throttle sensor SE1, an intake pressure sensor SE2, an upstream oxygen sensor SE3, a downstream oxygen sensor SE4, a crank sensor SE5, a shift cam sensor SE6, a wheel speed sensor SE7, an accelerator sensor SE8 and the alarm light AL as the configuration of the control system. In the present embodiment, the configuration including the ECU 10, the above-mentioned various sensors (SE1 to SE8) and the alarm light AL is equivalent to the catalyst degradation determining device of the present invention.

The throttle actuator 63 adjusts an opening of the throttle valve 62, thereby adjusting the flow rate of air guided from an air cleaner (not shown) to the engine 5a. The fuel injection device 61 injects fuel into the intake port of the engine 5a such that an air-fuel mixture is guided to the combustion chamber of the engine 5a.

The throttle sensor SE1 is provided in the vicinity of the throttle valve 62. The throttle sensor SE1 detects an opening (throttle opening) of the throttle valve 62 and outputs an electrical signal indicating the detected throttle opening. The intake pressure sensor SE2 is provided at a portion farther downstream than the throttle valve 62 in the intake pipe 60. The intake pressure sensor SE2 detects a pressure (intake pressure) in the intake pipe 60 as an intake state of the engine 5a and outputs an electrical signal indicating the detected intake pressure.

The upstream oxygen sensor SE3 is provided at a portion farther upstream than the three-way catalyst 53 in the muffler 52. The upstream oxygen sensor SE3 detects an oxygen concentration of an exhaust gas which has been exhausted from the engine 5a and has yet been cleaned by the three-way catalyst 53 and outputs an electrical signal indicating the detected oxygen concentration. The upstream oxygen sensor SE3 may be provided in the exhaust pipe 51 instead of the muffler 52.

The downstream oxygen sensor SE4 is provided at a portion farther downstream than the three-way catalyst 53 in the muffler 52. The downstream oxygen sensor SE4 detects an oxygen concentration of an exhaust gas, which has been exhausted from the engine 5a and has been cleaned by the three-way catalyst 53 and outputs an electrical signal indicating the detected oxygen concentration.

As described above, the three-way catalyst 53 may be provided in the exhaust pipe 51 instead of the muffler 52. Therefore, in a case where the three-way catalyst 53 is provided in the exhaust pipe 51, the upstream oxygen sensor SE3 and the downstream oxygen sensor SE4 may be provided in the exhaust pipe 51 to be respectively located at a portion farther upstream than the three-way catalyst 53 and a portion farther downstream than the three-way catalyst 53.

The crank sensor SE5 is provided in the vicinity of the engine 5a. The crank sensor SE5 detects a rotation speed (engine rotation speed) of the crankshaft of the engine 5a and outputs an electrical signal indicating the detected engine rotation speed. The shift cam sensor SE6 is provided in the engine unit 5 of FIG. 1. The shift cam sensor SE6 detects a rotation angle of the shift cam of the transmission 5b and outputs an electrical signal indicating the detected rotation angle.

The wheel speed sensor SE7 is provided in the vicinity of the lower end of the front fork 2 of FIG. 1. The wheel speed sensor SE7 detects a rotation speed of the front wheel 3 of FIG. 1 and outputs an electrical signal indicating the detected rotation speed. The wheel speed sensor SE7 may be provided in the vicinity of the rear end of the rear arm 6 of FIG. 1. In this case, the wheel speed sensor SE7 detects a rotation speed of the rear wheel 7 of FIG. 1 and outputs an electrical signal indicating the detected rotation speed.

The accelerator sensor SE8 is provided at the handle 4 of FIG. 1. The accelerator sensor SE8 detects an operation amount (accelerator opening) of the accelerator grip 4g by the rider and outputs an electrical signal indicating the detected accelerator opening.

The ECU 10 includes the CPU 10a, the ROM 10b and the RAM 10c, and the CPU 10a includes a running state acquirer 11, a travel controller 12, a state determiner 13, a determination executor 14, a degradation determiner 15 and an output controller 16. These functions of the CPU 10a are implemented by execution of the catalyst degradation determining program stored in the ROM 10b by the CPU 10a. Part or all of the plurality of functions of the ECU 10 may be implemented by hardware such as an electronic circuit.

The running state acquirer 11 acquires a throttle opening by receiving the output of the throttle sensor SE1. Further, by receiving the output of the intake pressure sensor SE2, the running state acquirer 11 calculates an amount (intake amount) of air guided to the combustion chamber per cycle of the engine 5a based on the received intake pressure and acquires the calculated intake amount as a running state. Further, by receiving the output of the upstream oxygen sensor SE3, the running state acquirer 11 acquires an oxygen concentration of an exhaust gas that has yet been cleaned by the three-way catalyst 53. Further, by receiving the output of the downstream oxygen sensor SE4, the running state acquirer 11 acquires an oxygen concentration of an exhaust gas that has been cleaned by the three-way catalyst 53.

Further, the running state acquirer 11 acquires an engine rotation speed as a running state by receiving the output of the crank sensor SE5 and acquires a gear position (gear ratio) corresponding to the detected rotation angle of the shift cam by receiving the output of the shift cam sensor SE6 as a running state. Further, the running state acquirer 11 calculates a moving speed (traveling speed) of the motorcycle 100 based on the rotation speed of the front wheel 3 (or the rear wheel 7) by receiving the output of the wheel speed sensor SE7 and acquires the calculated traveling speed as a running state. Further, the running state acquirer 11 acquires an accelerator opening by receiving the output of the accelerator sensor SEB.

The running state acquirer 11 may calculate the above-mentioned intake amount based on a map representing the predetermined relationship among a throttle opening, an engine rotation speed and an intake amount, and an actually acquired throttle opening and an actually acquired engine rotation speed. Further, the running state acquirer 11 may acquire a gear position without receiving the output of the shift cam sensor SE6. In this case, the running state acquirer 11 may acquire a gear position by calculating a gear ratio (reduction gear ratio) of the transmission 5b based on an actually acquired engine rotation speed and a calculated traveling speed, for example.

Throttle control information and target air-fuel ratio information are stored in the ROM 10b of the ECU 10 in advance. Throttle control information includes information representing the predetermined relationship among an engine rotation speed, a throttle opening and an accelerator opening. Target air-fuel ratio information includes information representing the predetermined relationship among an engine rotation speed, a throttle opening and a target air-fuel ratio.

The travel controller 12 controls the work of the throttle actuator 63 based on throttle control information and various information acquired by the running state acquirer 11 with the catalyst degradation determining work not executed. Further, the travel controller 12 controls a fuel injection point in time and a fuel injection period of time in the fuel injection device 61 based on target air-fuel ratio information, and various information acquired by the running state acquirer 11 with the catalyst degradation determining work not executed. In this manner, an opening of the throttle valve 62 is adjusted, and feedback control for bringing the air-fuel ratio of an air-fuel mixture close to a target air-fuel ratio is executed. Thus, the travel state of the motorcycle 100 is adjusted in accordance with an operation of the accelerator grip 5g by the rider.

In the motorcycle 100 according to the present embodiment, an allowable range of a traveling speed for allowing execution of the catalyst degradation determining work is defined to correspond to each of the plurality of gear positions (the plurality of predetermined gear ratios) of the transmission 5b. In the ROM 10b of the ECU 10, information representing a plurality of allowable ranges respectively corresponding to the plurality of gear positions of the transmission 5b is stored in advance as a gear position-traveling speed table.

Figures 3, 4:
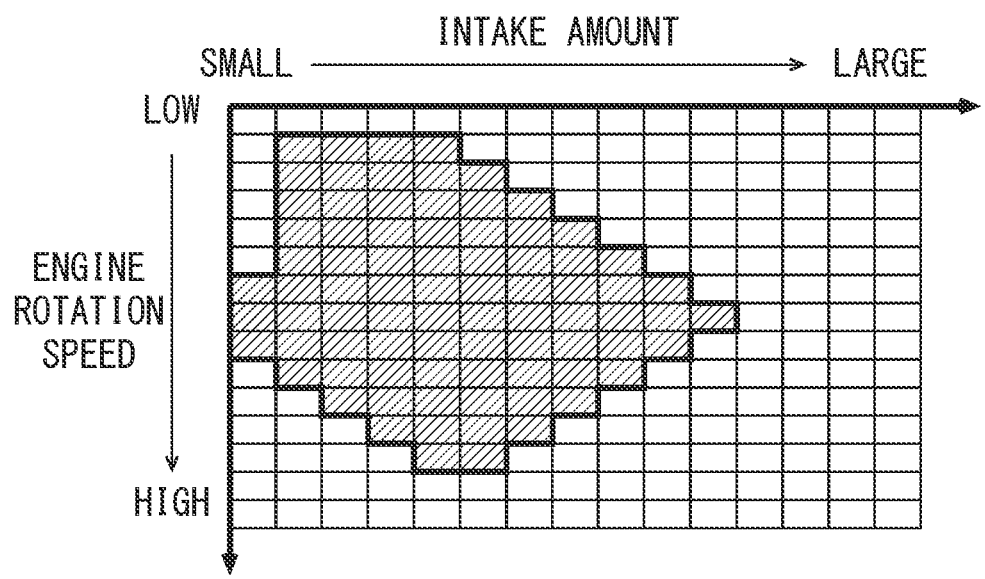
FIG. 3 is a diagram showing one example of a gear position-traveling speed table according to the first embodiment.
FIG. 4 is a diagram showing one example of an intake amount-rotation speed table according to the first embodiment.

FIG. 3 is a diagram showing one example of the gear position-traveling speed table according to the first embodiment. In the example of FIG. 3, whether a concerned speed range is an allowable range is shown every 10 km/h in regard to each of the first to sixth gear positions of the transmission 5b. A plurality of hatched ranges are a plurality of allowable ranges.

Specifically, in the gear position-traveling speed table of FIG. 3, an allowable range of the traveling speed corresponding to the first and second gear positions does not exist. The allowable range of the traveling speed corresponding to the third gear position is not less than 40 km/h and less than 50 km/h. The allowable range of the traveling speed corresponding to the fourth gear position is not less than 40 km/h and less than 80 km/h. The allowable range of the traveling speed corresponding to the fifth gear position is not less than 50 km/h and less than 80 km/h, and not less than 100 km/h and less than 120 km/h. The allowable range of the traveling speed corresponding to the sixth gear position is not less than 60 km/h and less than 130 km/h.

An allowable range of the traveling speed is defined for each type of the motorcycle 100 by an experiment, simulation or the like. For example, an experimenter rides the motorcycle 100 of a type subject to setting of an allowable range, and changes a traveling speed with the catalyst degradation determining work executed in regard to each of a plurality of gear positions of the transmission 5b. At this time, the range of the traveling speed in regard to which the experimenter has determined that riding comfort is not degraded is an allowable range of the traveling speed for a concerned gear position.

In the example of FIG. 3, the higher a gear position is (the lower the gear ratio is), the larger the allowable range of a traveling speed is defined to be. In this case, when the gear position of the transmission 5b is high (when the gear ratio is low), opportunities to be able to execute the catalyst degradation determining work increase.

Further, in the motorcycle 100 according to the present embodiment, an allowable region representing the allowable relationship between an intake amount of the engine 5a and an engine rotation speed is defined as the information for allowing execution of the catalyst degradation determining work. In the ROM 10b of the ECU 10 (FIG. 2), the information representing this allowable region is stored in advance as an intake amount-rotation speed table.

FIG. 4 is a diagram showing one example of the intake amount-rotation speed table according to the first embodiment. In the intake amount-rotation speed table of FIG. 4, the ordinate indicates an engine rotation speed, and the abscissa indicates an intake amount. Further, the hatched region is the allowable region representing the allowable relationship between an intake amount of the engine 5a and an engine rotation speed.

The allowable region of FIG. 4 is set such that the engine rotation speed is limited to an intermediate speed in the entire range of the engine rotation speed as the intake amount increases and the intake amount is limited to an amount slightly smaller than an intermediate amount in the entire range of the intake amount as the engine rotation speed increases. The allowable region is defined for each type of the motorcycle 100 by an experiment, simulation or the like such that certain credibility is kept in regard to a result of determination as to the degradation state of the three-way catalyst 53 by the catalyst degradation determining work.

The state determiner 13 of FIG. 2 carries out the allowable condition determination. Specifically, the state determiner 13 determines whether a plurality of running states in regard to the motorcycle 100 satisfy a plurality of predetermined allowable conditions. The plurality of allowable conditions include that a traveling speed of the motorcycle 100 is in the allowable range of the traveling speed corresponding to a set gear position and the relationship between an intake amount of the engine 5a and an engine rotation speed is in the allowable region.

As such, the state determiner 13 determines whether a traveling speed is in the allowable range of a traveling speed corresponding to a set gear position based on the gear position-traveling speed table. Further, the state determiner 13 determines whether the relationship between an intake amount of the engine 5a and an engine rotation speed is in an allowable region based on the intake amount-rotation speed table.

Further, the plurality of allowable conditions further include that the engine 5a has started, the engine 5a has been working continuously for a predetermined period of time, a rotation speed of the engine 5a does not exceed a predetermined upper limit speed and an intake amount of the engine 5a is in a certain range, for example.

In the present embodiment, a plurality of allowable conditions except for "a traveling speed of the motorcycle 100 is in an allowable range of the traveling speed corresponding to a set gear position, and the relationship between an intake amount of the engine 5a and an engine rotation speed is in an allowable region" are collectively termed as other allowable conditions.

The determination executor 14 executes the catalyst degradation determining work in a case where the state determiner 13 determines that a plurality of running states satisfy all of the allowable conditions. On the other hand, the determination executor 14 does not execute the catalyst degradation determining work in a case where the state determiner 13 determines that at least part of a plurality of running states does not satisfy the allowable conditions.

When the motorcycle 100 is traveling, feedback control for the air-fuel ratio of an air-fuel mixture is basically executed based on the control of the travel controller 12. Thus, the air-fuel ratio of an air-fuel mixture changes between rich and lean with a target air-fuel ratio as a basis. Here, the catalyst degradation determining work includes forcibly increasing a change period and a change range of the air-fuel ratio of an air-fuel mixture caused by the feedback control as compared to a case where the catalyst degradation determining work is not executed. A change period and a change range of the air-fuel ratio of an air-fuel mixture are adjusted by a change of a fuel injection point in time, a fuel injection period of time, etc. in the fuel injection device 61 by the determination executor 14.

The running state acquirer 11 acquires oxygen concentrations that are continuously output from the upstream oxygen sensor SE3 and the downstream oxygen sensor SE4 in a predetermined period during the catalyst degradation determining work. The degradation determiner 15 determines whether the three-way catalyst 53 is degraded based on changes of oxygen concentrations that are output from the upstream oxygen sensor SE3 and the downstream oxygen sensor SE4 during the catalyst degradation determining work and acquired by the running state acquirer 11.

As in the example described in Background Art, the a degradation state may be determined by calculation of the ratio of an inversion frequency of output of the downstream oxygen sensor SE4 with respect to an inversion frequency of output of the upstream oxygen sensor SE3 and use of the calculated ratio of inversion frequency. An inversion frequency is the number of times an output voltage of each oxygen sensor (SE3, SE4) crosses a predetermined threshold value in a predetermined period of time. Alternatively, the a degradation state may be determined by calculation of the matching degree of two output waveforms by comparison between an output waveform of the upstream oxygen sensor SE3 and an output waveform of the downstream oxygen sensor SE4 and use of the calculated matching degree. Further alternatively, a degradation state may be determined by calculation of a response delay period of time between the work of the fuel injection device 61 and a change in oxygen concentration of an exhaust gas and use of the calculated response delay period of time.

The output controller 16 outputs an alarm in a case where the degradation determiner 15 determines that the three-way catalyst 53 is degraded and a case where a problem determining device (not shown) determines that there is a problem with accessories such as various sensors. Specifically, the output controller 16 controls the alarm light AL of FIG. 1 such that the alarm light AL lights up or blinks in one predetermined luminescent color (red or the like), for example.

On the other hand, the output controller 16 does not output an alarm in a case where it is not determined that the three-way catalyst 53 is degraded and a case where the problem determining device (not shown) does not determine that there is a problem with accessories such as various sensors. Specifically, the output controller 16 controls the alarm light AL of FIG. 1 such that the alarm light AL lights up in another luminescent color (yellow, green or the like) or is turned off.

As described above, the alarm light AL outputs a common alarm in regard to a plurality of problem types. Therefore, even though recognizing the output of a common alarm, the rider or an operator who maintains the motorcycle 100 cannot identify what problem is present with the motorcycle 100. As such, the ECU 10 according to the present embodiment has a self-diagnosis function (so-called on-board diagnosis) for specifying the type of a problem with the motorcycle 100.

With this self-diagnosis function, a dedicated diagnosis tool is connected to a diagnosis port provided in a vehicle body when an alarm is output by the alarm light AL, so that the type of a currently present problem is specified. Further, the specified problem type is output from the diagnosis tool. Thus, the rider or the operator can identify the type of a currently present problem with use of the dedicated diagnosis tool in a case where an alarm is output from the alarm light AL.

Instead of the above-mentioned example of the self-diagnosis function, the ECU 10 may have a function for further presenting the problem type corresponding to an output alarm (a problem confirming function) when an alarm is output by the alarm light AL.

For example, in regard to a plurality of problems types corresponding to an alarm output by the alarm light AL, luminescent colors and lighting patterns of the alarm light AL may be defined respectively. In this case, in a case where an instruction for executing the problem confirming function is provided, the output controller 16 causes the alarm light AL to light up in a predetermined luminescent color and a predetermined lighting pattern in regard to a problem type corresponding to an output alarm. Thus, the rider or the operator can easily identify a problem type by viewing a luminescent state of the alarm light AL.

Alternatively, when an instruction for executing the problem confirming function is provided, the output controller 16 may display a message such as an error code indicating the problem type corresponding to an output alarm in the display of the meter unit 4m. Thus, the rider or the operator can easily identify a problem type based on a message displayed in the display of the meter unit 4m.

Therefore, the rider or the operator who maintains the motorcycle 100 can easily identify a degradation state of the three-way catalyst 53 by using the problem confirming function.

In the meter unit 4m according to the present embodiment, another alarm light that lights up only in a case where it is determined that the three-way catalyst 53 is degraded may be provided in addition to the above-mentioned alarm light AL. Alternatively, the above-mentioned alarm light AL may be driven in a specific luminescent color and in a specific lighting pattern only in a case where it is determined that the three-way catalyst 53 is degraded. Further alternatively, in the display (crystal display) of the meter unit 4m, when an alarm is output by the alarm light AL, a message indicating a problem type corresponding to the output alarm may be displayed. In these cases, even in a case where the ECU 10 does not have the problem confirming function, the rider or the operator can easily identify a degradation state of the three-way catalyst 53.

[3] Catalyst Degradation Determining Device

Figure 5:
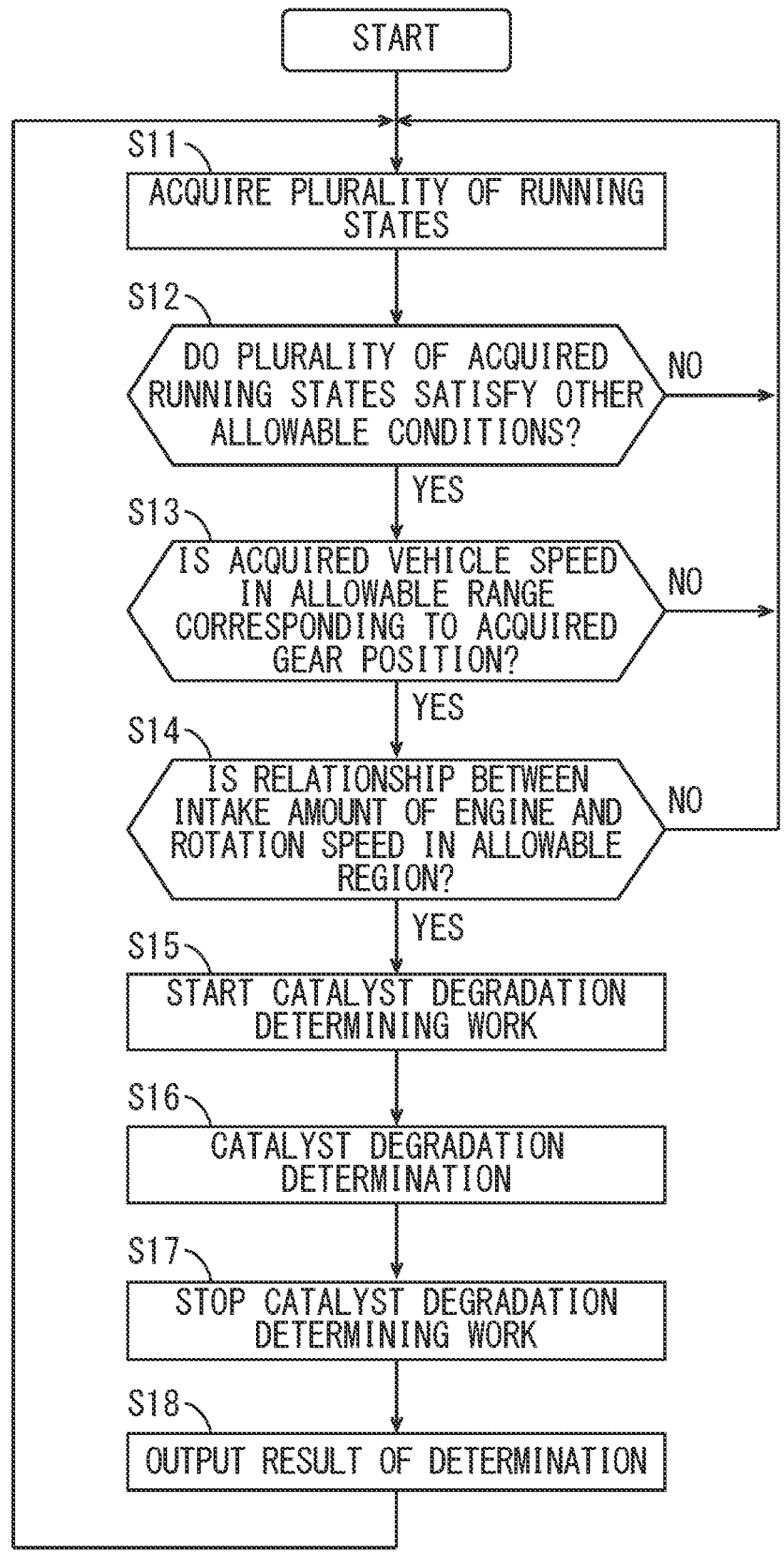
FIG. 5 is a flowchart of a catalyst degradation determining process according to the first embodiment.

FIG. 5 is a flowchart of a catalyst degradation determining process according to the first embodiment. The catalyst degradation determining process is started when the CPU 10a of the ECU 10 executes the catalyst degradation determining program in response to power-on of the motorcycle 100 or start-up of the engine 5a.

As shown in FIG. 5, when the catalyst degradation determining process is started, the running state acquirer 11 acquires a plurality of running states based on the output from various sensors (SE1 to SE8) (step S11). The plurality of acquired running states include a throttle opening, an intake amount of the engine 5a, an oxygen concentration of an exhaust gas that has yet been cleaned by the three-way catalyst 53 and an oxygen concentration of an exhaust gas that has been cleaned by the three-way catalyst 53. Further, the plurality of acquired running states include an engine rotation speed, a gear position (gear ratio) of the transmission 5b and a traveling speed of the motorcycle 100.

Next, the state determiner 13 determines whether the plurality of running states acquired in the step S11 satisfy the other allowable conditions (step S12). In a case where the plurality of running states do not satisfy the other allowable conditions, the state determiner 13 causes the process to return to the step S11. Thus, a plurality of running states are acquired again. On the other hand, in a case where the plurality of running states satisfy the other allowable conditions, the state determiner 13 determines whether an acquired traveling speed is in the allowable range of the traveling speed corresponding to an acquired gear position based on the gear position-traveling speed table stored in the ROM 10b (step S13).

In the step S13, in a case where the traveling speed is not in the allowable range, the state determiner 13 causes the process to return to the step S11. Thus, a plurality of running states are acquired again. On the other hand, in a case where the traveling speed is in the allowable range, the state determiner 13 determines whether the relationship between an acquired intake amount of the engine 5a and an acquired engine rotation speed is in an allowable region based on the intake amount-rotation speed table (step S14).

In the step S14, in a case where the relationship between the intake amount and the acquired engine rotation speed is not in the allowable region, the state determiner 13 causes the process to return to the step S11. Thus, a plurality of running states are acquired again. On the other hand, in a case where the relationship between an intake amount and an acquired engine rotation speed is in an allowable region, the determination executor 14 starts the catalyst degradation determining work (step S15).

Next, the degradation determiner 15 determines whether the three-way catalyst 53 is degraded based on changes of oxygen concentrations output from the upstream oxygen sensor SE3 and the downstream oxygen sensor SE4 during the catalyst degradation determining work (step S16). When determination completes, the determination executor 14 stops the catalyst degradation determining work (step S17).

Thereafter, the output controller 16 outputs a result of determination in regard to a degradation state of the three-way catalyst 53 by controlling the alarm light AL of FIG. 1 (step S18) and causes the process to return to the step S11. In the motorcycle 100 according to the present embodiment, as the configuration for outputting a result of determination in regard to a degradation state of the three-way catalyst 53, a sound output device that outputs a result of determination in regard to a degradation state by speech may be provided in addition to the alarm light AL. In this case, the output controller 16 may generate an alarm sound for presenting degradation of the three-way catalyst 53 by controlling the sound output device in a case where it is determined that the three-way catalyst 53 is degraded.

In the catalyst degradation determining process of FIG. 5, the order for execution of the steps S12, S13 and S14 is not limited to the above-mentioned example. The step S12 may be executed between any two steps out of the steps S13 to S15. Further, the step S13 may be executed before the step S12 or after the step S14. Further, the step S14 may be executed between any two steps out of the steps S11 to S13.

[4] Effects of First Embodiment (1) Allowable conditions suitable for determining work in regard to a degradation state of the three-way catalyst 53 differ depending on a gear position of the transmission 5b. Therefore, in a case where being set regardless of a gear position of the transmission 5b, allowable conditions are limited to an extremely narrow range due to consideration for riding comfort of the motorcycle 100. In contrast, in the above-mentioned ECU 10, allowable conditions for allowing execution of the catalyst degradation determining work are defined at least based on a gear position. Thus, whether a plurality of running states are suitable for the catalyst degradation determining work of the three-way catalyst 53 can be determined appropriately in regard to each gear position of the transmission 5b. Therefore, it is possible to appropriately ensure opportunities to execute the catalyst degradation determining work while suppressing the influence on the riding comfort for the rider.

(2) In the ECU 10, the gear position-traveling speed table and the intake amount-rotation speed table are stored in the ROM 10b in advance. Further, whether a traveling speed is in the allowable range of the traveling speed corresponding to an acquired gear position is determined based on the gear position-traveling speed table. Further, whether the relationship between an intake amount of the engine 5a and an engine rotation speed is in an allowable region is determined based on the intake amount-rotation speed table. Whether the catalyst degradation determining work is executed is determined based on these results determination.

In this case, it is not necessary to define a plurality of allowable regions respectively corresponding to the plurality of gear positions of the transmission 5b in regard to the relationship between an intake amount of the engine 5a and an engine rotation speed. Thus, even in a case where a large number of gear positions of the transmission 5b are present, an information amount to be stored in the ROM 10b can be reduced. Further, a process of determining whether a running state satisfies allowable conditions can be simplified. As a result, because a period of time required for a determination process can be shortened, it is possible to further increase opportunities to execute the determining work in regard to a degradation state of the three-way catalyst 53 while suppressing the influence on the riding comfort for the rider.

2. Second Embodiment

Differences of a motorcycle 100 according to the second embodiment from the motorcycle 100 according to the first embodiment will be described. The motorcycle 100 according to the present embodiment is configured to be workable in respective first, second and third control modes in which an opening of the throttle valve 62 changes with respect to an operation of the accelerator grip 5g with respective first, second and third responsivenesses. The first responsiveness is the highest among the first, second and third responsivenesses, and the third responsiveness is the lowest among the first, second and third responsivenesses. The second responsiveness is about an intermediate level, and lower than the first responsiveness and higher than the third responsiveness.

In a case where the motorcycle 100 works in the first control mode, a torque of the engine 5a changes in accordance with an operation amount in an entire operation region in which the accelerator grip 4a is operable, for example. On the other hand, in a case where the motorcycle 100 works in the second control mode, a torque of the engine 5a changes in accordance with an operation amount only in a first partial region of the entire operation region in which the accelerator grip 4g is operable, for example. On the other hand, in a case where the motorcycle 100 works in the third control mode, a torque of the engine 5a changes in accordance with an operation amount only in a second partial region, smaller than the first partial region, of the entire operation region in which the accelerator grip 4a is operable, for example.

Figure 6:
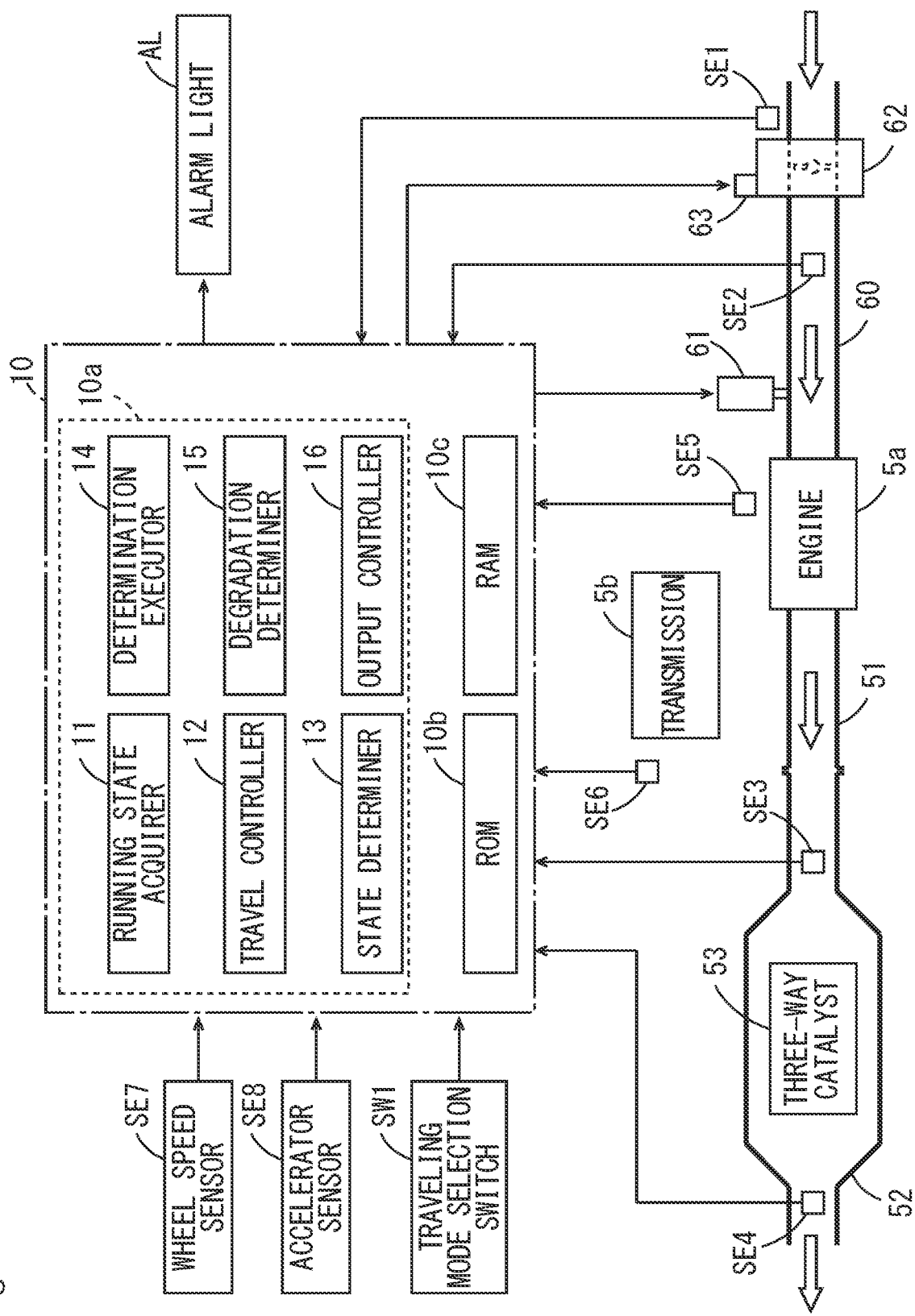
FIG. 6 is a block diagram showing a control system of a motorcycle according to a second embodiment.

FIG. 6 is a block diagram showing the control system of the motorcycle 100 according to the second embodiment. As shown in FIG. 6, a motorcycle 100 according to the second embodiment includes a traveling mode selection switch SW1 in addition to the configuration of the motorcycle 100 according to the first embodiment as the configuration of the control system. Also in the present embodiment, similarly to the first embodiment, the configuration including an ECU 10, various sensors (SE1 to SE8) and an alarm light AL is equivalent to the catalyst degradation determining device of the present invention.

The traveling mode selection switch SW1 is provided at a handle 4 of the motorcycle 100, for example, and is configured to be capable of selecting any of the first to third control modes by a rider's operation.

Throttle control information pieces respectively corresponding to the first to third control modes are stored in advance in a ROM 10b of the ECU 10 according to the present embodiment. Here, one of the first to third control modes is selected by a rider's operation of the traveling mode selection switch SW1. In this case, the travel controller 12 controls the work of the throttle actuator 63 based on the throttle control information piece corresponding to a selected control mode with the catalyst degradation determining work not executed. Thus, the rider can steer the motorcycle 100 with a desired responsiveness.

Further, in the present embodiment, a plurality of allowable ranges of the traveling speed for allowing execution of the catalyst degradation determining work are defined as first, second and third allowable conditions to respectively correspond to the first, second and third control modes. The information representing the plurality of allowable ranges respectively corresponding to the first, second and third control modes is stored in the ROM 10b in advance as first, second and third gear position-traveling speed tables.

FIG. 7 is a diagram showing one example of the first, second and third gear position-traveling speed tables according to the second embodiment. In the first, second and third gear position-traveling speed tables of FIG. 7, the plurality of hatched ranges are a plurality of allowable ranges similarly to the example of FIG. 3.

In the first gear position-traveling speed table shown in the upper field of FIG. 7, the allowable ranges of the traveling speed corresponding to the first to third gear positions are not present. The allowable range of the traveling speed corresponding to the fourth gear position is not less than 40 km/h and less than 50 km/h. The allowable range of the traveling speed corresponding to the fifth gear position is not less than 50 km/h and less than 80 km/h. The allowable range of the traveling speed corresponding to the sixth gear position is not less than 60 km/h and less than 80 km/h, and not less than 100 km/h and less than 130 km/h. The second gear position-traveling speed table shown in the middle field of FIG. 7 is the same as the gear position-traveling speed table of FIG. 3 according to the first embodiment.

In the third gear position-traveling speed table shown in the lower field in FIG. 7, the allowable range of the traveling speed corresponding to the first gear position is not present. The allowable range of the traveling speed corresponding to the second gear position is not less than 40 km/h and less than 50 km/h. The allowable range of the traveling speed corresponding to the third gear position is not less than 40 km/h and less than 80 km/h. The allowable range of the traveling speed corresponding to the fourth gear position is not less than 40 km/h and less than 80 km/h. The allowable range of the traveling speed corresponding to the fifth gear position is not less than 50 km/h and less than 120 km/h. The allowable range of the traveling speed corresponding to the sixth gear position is not less than 60 km/h and less than 130 km/h.

As described above, in the first to third gear position-traveling speed tables of FIG. 7, the lower the responsiveness of a corresponding control mode is, the larger an allowable range of the traveling speed is.

A state determiner 13 according to the present embodiment reads the gear position-traveling speed table corresponding to a selected control mode out of the first, second and third gear position-traveling speed tables from the ROM 10b during allowable condition determination. Further, the state determiner 13 determines whether a vehicle speed is in the allowable range corresponding to a set gear position based on the read gear position-traveling speed table.

In the present embodiment, an intake amount-rotation speed table is stored in the ROM 10b similarly to the first embodiment. As such, the state determiner 13 determines whether the relationship between an intake amount of the engine 5a and an engine rotation speed is in an allowable region based on the intake amount-rotation speed table of FIG. 4 in addition to determination of whether a vehicle speed is in the allowable range corresponding to a set gear position. Further, the state determiner 13 determines whether a plurality of running states of the motorcycle 100 satisfy the other allowable conditions corresponding to the first embodiment.

Figure 8:
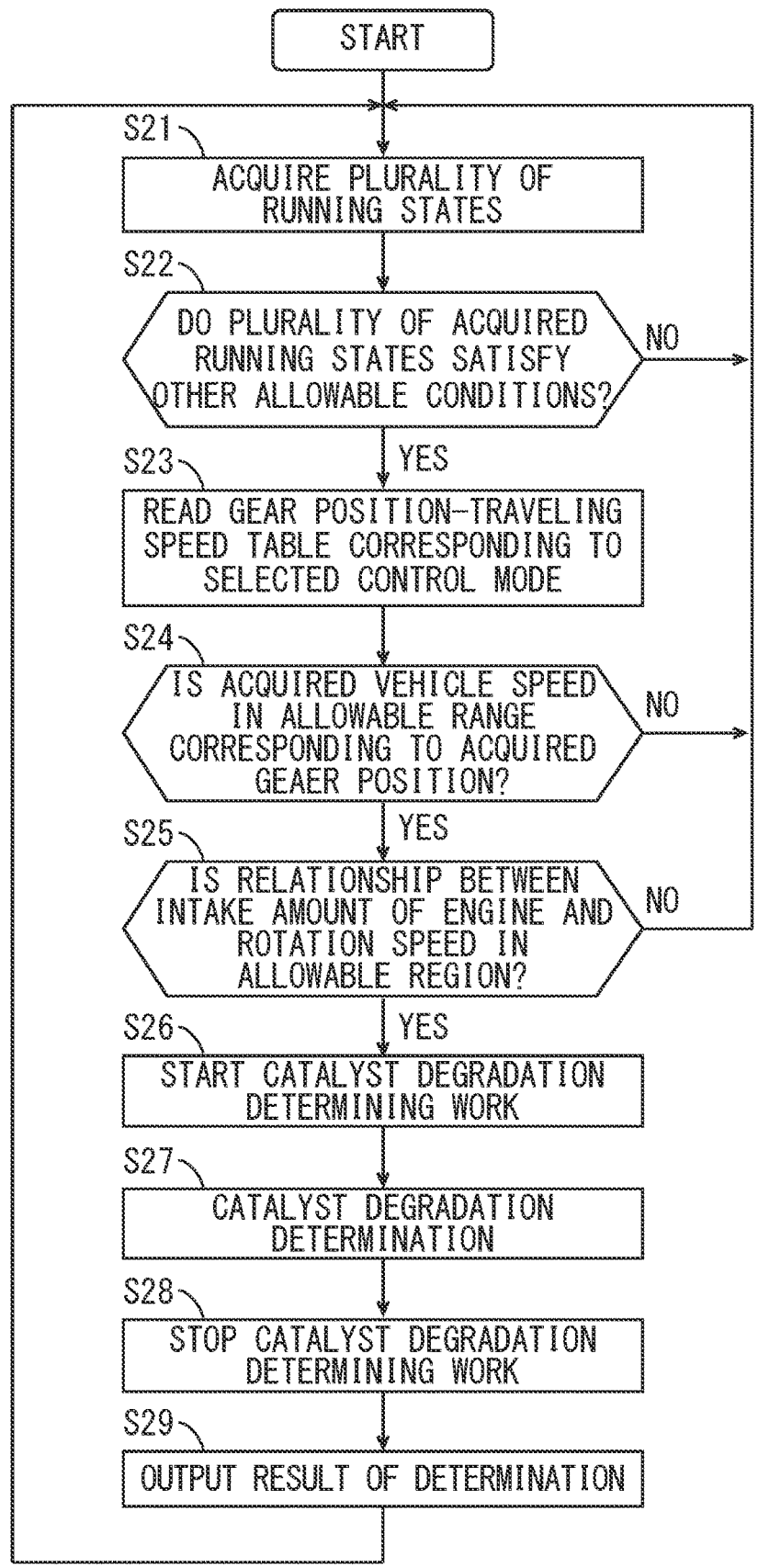
FIG. 8 is a flowchart of a catalyst degradation determining process according to the second embodiment.

FIG. 8 is a flowchart of a catalyst degradation determining process according to the second embodiment. In the catalyst degradation determining process according to the second embodiment of FIG. 8, one of the first to third control modes is selected in an initial state.

As shown in FIG. 8, in the catalyst degradation determining process according to the present embodiment, the steps S21, S22, S24, S25, S26, S27, S28 and S29 are respectively the same as the steps S11, S12, S13, S14, S15, S16, S17 and S18 of the catalyst degradation determining process according to the first embodiment.

In the present embodiment, after it is determined that the plurality of running states satisfy the other allowable conditions, a process of reading the gear position-traveling speed table corresponding to a selected control mode is executed before the process of the step S24 of determining whether a traveling speed is in the allowable range of the traveling speed corresponding to a gear position (step S23). Thereafter, in the step S24, whether a traveling speed is in the allowable range of a traveling speed corresponding to an acquired gear position is determined with use of the read gear position-traveling speed table.

In this manner, in the present embodiment, the allowable condition determination is carried out with use of the plurality of intake amount-rotation speed tables respectively corresponding to the plurality of control modes for adjustment of responsiveness. Thus, steerability of the motorcycle 100 in accordance with rider's preference can be realized, and opportunities to execute the catalyst degradation determining work can be ensured appropriately while the influence on the riding comfort is suppressed.

In the catalyst degradation determining process of FIG. 8, the step S22 may be executed between any two steps out of the steps S23 to S26. Further, the steps S23 and S24 may be executed before the step S22 or after the step S25. Further, the step S25 may be executed between any two steps out of the steps S21 to S24.

While the motorcycle 100 is configured to be workable in the first, second and third control modes in the present embodiment, the motorcycle 100 may be configured to be workable in a plurality of control modes. In this case, a plurality of gear position-traveling speed tables respectively corresponding to the plurality of control modes workable in the motorcycle 100 are stored in the ROM 10b.

For example, the motorcycle 100 may be configured to be workable only in the first and second control modes. In this case, first and second gear position-traveling speed tables respectively corresponding to the first and second control modes are stored in the ROM 10b of the ECU 10. Alternatively, the motorcycle 100 may be configured to be workable in the first to fourth control modes. In this case, first to fourth gear position-traveling speed tables respectively corresponding to the first to fourth control modes are stored in the ROM 10b of the ECU 10. During the allowable condition determination, a gear position-traveling speed table corresponding to a selected control mode is used.

3. Third Embodiment

In regard to a motorcycle 100 according to the third embodiment, differences from the motorcycle 100 according to the first embodiment will be described. The configuration of a control system of the motorcycle 100 according to the present embodiment is basically the same as the configuration (FIG. 2) of the control system of the motorcycle 100 according to the first embodiment. However, in a ROM 10b of an ECU 10, the gear position-traveling speed table according to the first embodiment is not stored. In the ROM 10b, a plurality of intake amount-rotation speed tables respectively corresponding to a plurality of gear positions (a plurality of predetermined gear ratios) of a transmission 5b are stored in advance. That is, in the present embodiment, an allowable region representing the allowed relationship between an intake amount of an engine 5a and an engine rotation speed is defined to correspond to each of the plurality of gear positions of the transmission 5b.

Figure 9:
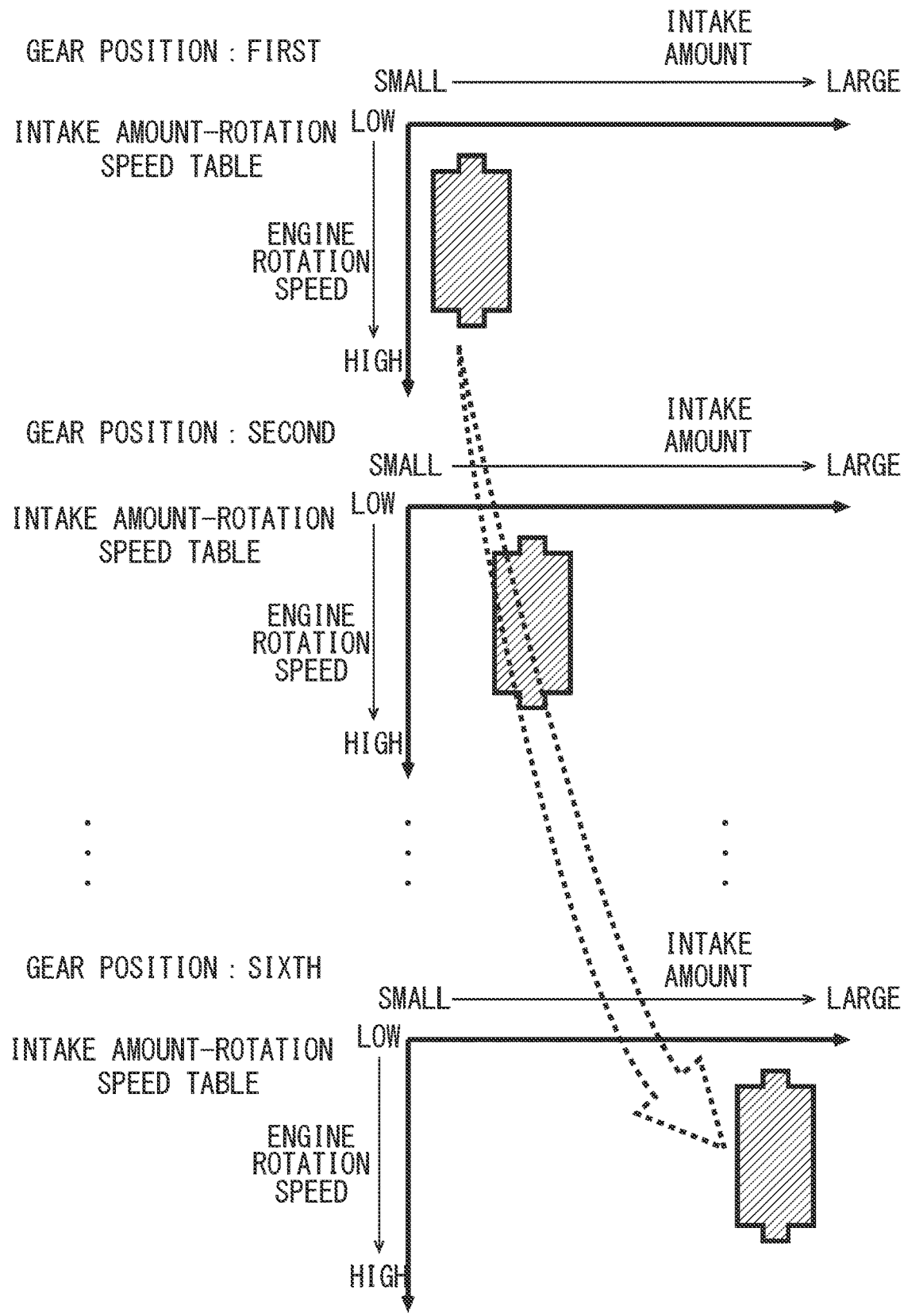
FIG. 9 is a diagram showing one example of a plurality of intake amount-rotation speed tables according to a third embodiment.

FIG. 9 is a diagram showing one example of a plurality of intake amount-rotation speed tables according to the third embodiment. In FIG. 9, intake amount-rotation speed tables corresponding to the third to fifth gear positions out of the first to sixth gear positions are not shown. In each intake amount-rotation speed table of FIG. 9, the ordinate indicates an engine rotation speed, and the abscissa indicates an intake amount similarly to the example of FIG. 4. Further, the hatched region is the allowable region representing the allowable relationship between an intake amount of the engine 5a and an engine rotation speed.

According to the example of FIG. 9, the sizes of the plurality of allowable regions in the plurality of intake amount-rotation speed tables are substantially the same regardless of the level of the gear position. On the other hand, as indicated by the thick outlined dotted arrow in FIG. 9, each allowable region is set such that the higher a corresponding gear position is, the higher the range of an intake amount is.

The state determiner 13 according to the present embodiment reads an intake amount-rotation speed table corresponding to a set gear position out of the plurality of intake amount-rotation speed tables respectively corresponding to the first to sixth gear positions during the allowable condition determination. Further, the state determiner 13 determines whether the relationship between an intake amount of the engine 5a and an engine rotation speed is in an allowable region based on the read intake amount-rotation speed table. Further, the state determiner 13 determines whether a plurality of running states of the motorcycle 100 satisfy the other allowable conditions corresponding to the first embodiment.

Figure 10:
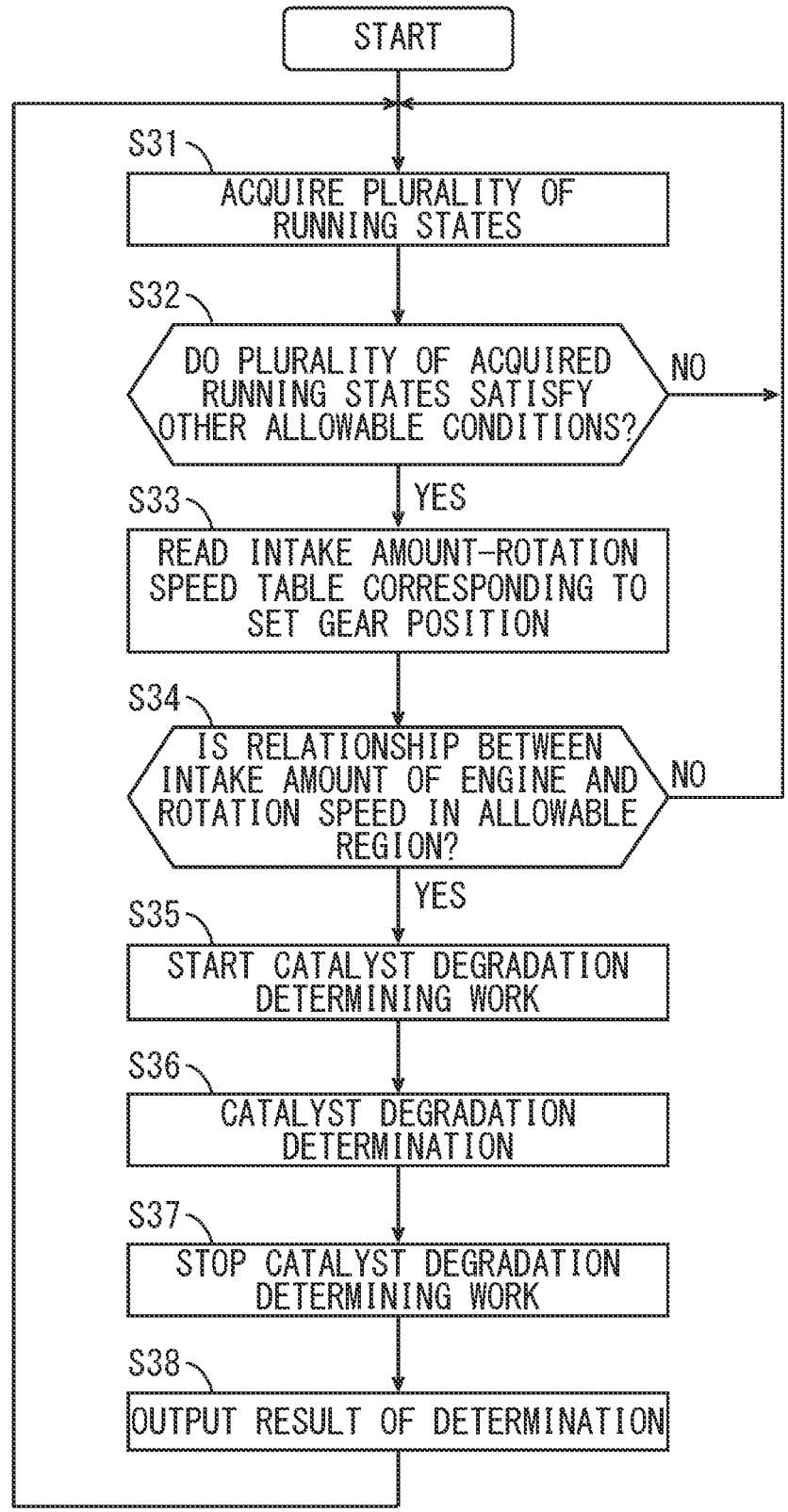
FIG. 10 is a flowchart of a catalyst degradation determining process according to the third embodiment.

FIG. 10 is a flowchart of a catalyst degradation determining process according to the third embodiment. In the catalyst degradation determining process according to the third embodiment of FIG. 10, a gear position of the transmission 5b is set to one of the first to sixth gear positions in an initial state.

As shown in FIG. 10, in the catalyst deterioration determining process according to the present embodiment, the steps S31, S32, S34, S35, S36, S37 and S38 are respectively the same as the steps S11, S12, S14, S15, S16, S17 and S18 of the catalyst degradation determining process according to the first embodiment.

In the present embodiment, the step S13 of FIG. 5 which is a process of determining whether a traveling speed is in the allowable range of a traveling speed corresponding to a gear position is not executed. After it is determined that the plurality of running states satisfy the other allowable conditions in the step S32, a process of reading an intake amount-rotation speed table corresponding to a set gear position is executed (step S33). Thereafter, in the step S34, whether the relationship between an acquired intake amount of the engine 5a and an acquired engine rotation speed is in an allowable region is determined with use of the read intake amount-rotation speed table.

In this manner, in the present embodiment, the allowable condition determination is carried out with use of the plurality of intake amount-rotation speed tables respectively corresponding to the plurality of gear positions. Therefore, similarly to the first embodiment, whether the plurality of running states are suitable for the catalyst degradation determining work in regard to the three-way catalyst 53 is determined appropriately for each gear position of the transmission 5b. As a result, it is possible to appropriately ensure opportunities to execute the catalyst degradation determining work while suppressing the influence on the riding comfort for the rider.

In the catalyst degradation determining process of FIG. 10, the steps S32 and S33 may be executed in a reverse order. Further, the step S32 may be executed after the step S34.

4. Fourth Embodiment

In regard to a motorcycle 100 according to the fourth embodiment, differences from the motorcycle 100 according to the third embodiment will be described. The motorcycle 100 according to the present embodiment is configured to be workable in the first, second and third control modes similarly to the motorcycle 100 according to the second embodiment. Therefore, the configuration of the control system of the motorcycle 100 according to the present embodiment is basically the same as the configuration (FIG. 6) of the control system of the motorcycle 100 according to the second embodiment.

In a ROM 10b of an ECU 10 according to the present embodiment, a group including a plurality of intake amount-rotation speed tables corresponding to each of a plurality of gear positions (a plurality of predetermined gear ratios) is stored in advance to correspond to a plurality of control modes. Specifically, in the ROM 10b, a group including a plurality of intake amount-rotation speed tables corresponding to the first control mode is stored as a first intake amount-rotation speed table group. Further, in the ROM 10b, a group including a plurality of intake amount-rotation speed tables corresponding to the second control mode is stored as a second intake amount-rotation speed table group. Further, in the ROM 10b, a group including a plurality of intake amount-rotation speed tables corresponding to the third control mode is stored as a third intake amount-rotation speed table group.

Figure 11:
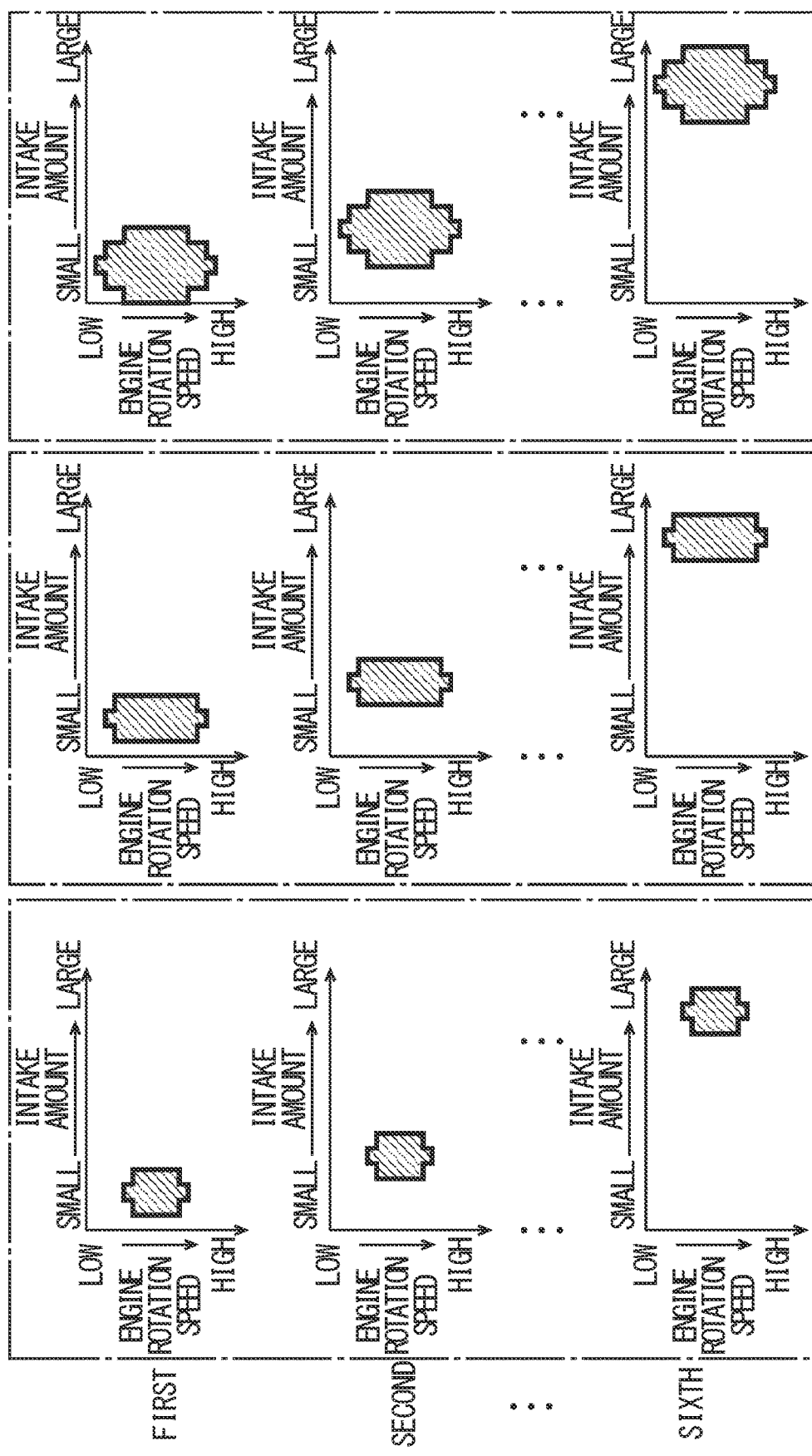
FIG. 11 is a diagram showing first, second and third intake amount-rotation speed table groups according to a fourth embodiment.

FIG. 11 is a diagram showing one example of first, second and third intake amount-rotation speed table groups according to the fourth embodiment. As indicated by the one-dot and dash lines in FIG. 11, each of the first, second and third intake amount-rotation speed table groups includes a plurality of intake amount-rotation speed tables respectively corresponding to the first to sixth gear positions. In each intake amount-rotation speed table shown in FIG. 11, the ordinate indicates an engine rotation speed, and the abscissa indicates an intake amount similarly to the example of FIG. 4. Further, the hatched region is the allowable region representing the allowable relationship between an intake amount of the engine 5a and an engine rotation speed.

According to the example of FIG. 11, the sizes of a plurality of allowable regions in a plurality of intake amount-rotation speed tables that constitute one intake amount-rotation speed table group are substantially the same regardless of the level of a gear position. However, when the first, second and third intake amount-rotation speed table groups are compared to one another, the lower the responsiveness of a corresponding control mode is, the larger the size of a plurality of allowable regions in the plurality of intake amount-rotation speed tables is.

The state determiner 13 according to the present embodiment selects the intake amount-rotation speed table group corresponding to a selected control mode out of the first, second and third intake amount-rotation speed table groups during the allowable condition determination. Further, the state determiner 13 reads the intake amount-rotation speed table corresponding to a set gear position out of the selected intake amount-rotation speed table group from the ROM 10b. Further, the state determiner 13 determines whether the relationship between an intake amount of the engine 5a and an engine rotation speed is in an allowable region based on the read intake amount-rotation speed table. Further, the state determiner 13 determines whether a plurality of running states of the motorcycle 100 satisfy the other allowable conditions according to the first embodiment.

Figure 12:
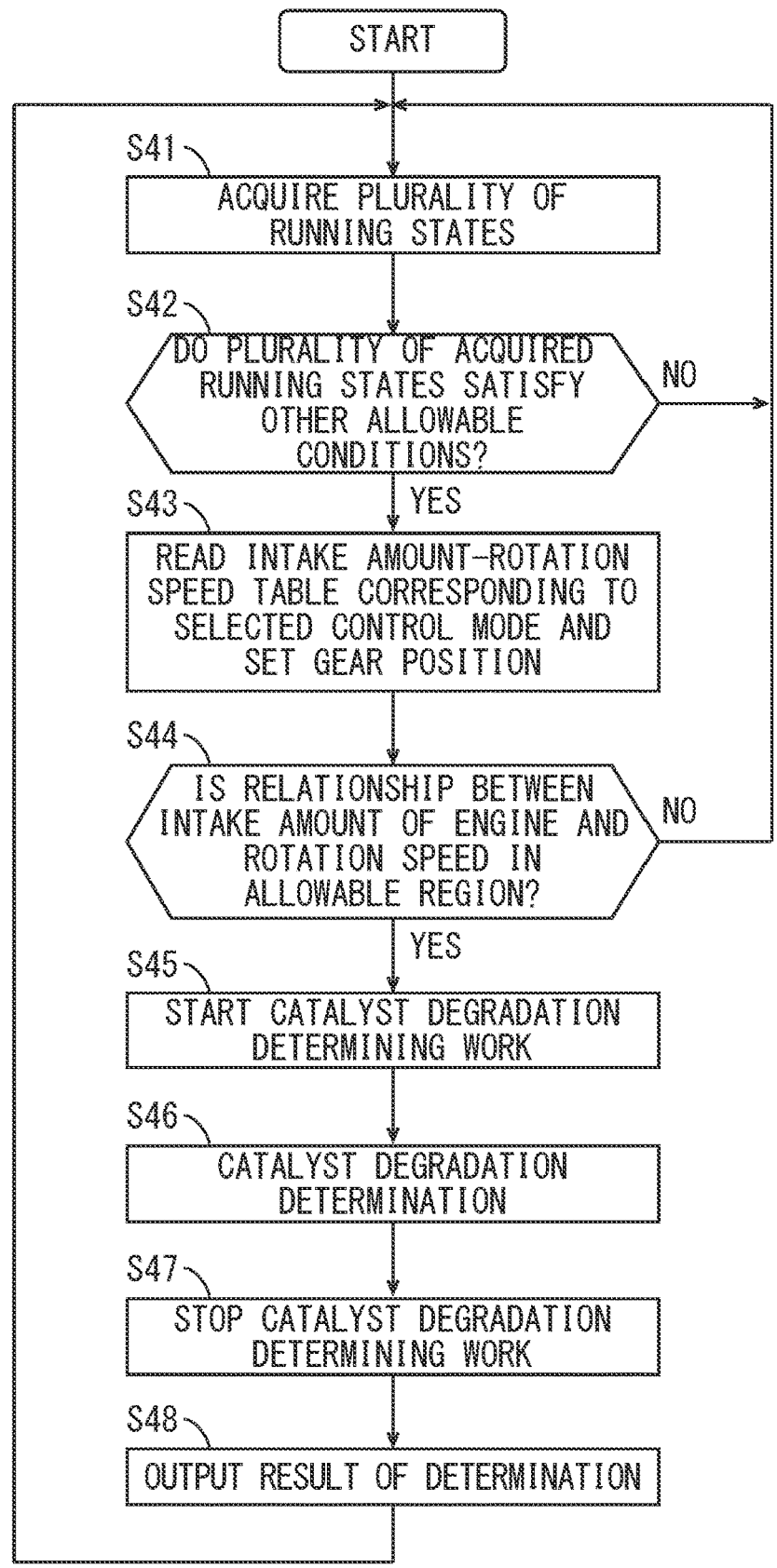
FIG. 12 is a flowchart of a catalyst degradation determining process according to the fourth embodiment.

FIG. 12 is a flowchart of a catalyst degradation determining process according to the fourth embodiment. In the catalyst degradation determining process according to the fourth embodiment of FIG. 12, any one of the first to third control modes is selected in an initial state. Further, the gear position of the transmission 5b is set to one of the first to sixth gear positions in the initial state.

As shown in FIG. 12, in the catalyst degradation determining process according to the present embodiment, the steps S41, S42, S44, S45, S46, S47 and S48 are respectively the same as the steps S31, S32, S34, S35, S36, S37 and S38 of the catalyst degradation determining process according to the third embodiment.

In the present embodiment, after it is determined in the step S42 that a plurality of running states satisfy the other allowable conditions, the intake amount-rotation speed table corresponding to a selected control mode and corresponding to a set gear position is read (step S43). More specifically, the gear position-traveling speed table group corresponding to the selected control mode is selected from the first, second and third gear position-traveling speed table groups stored in the ROM 10b. Further, the intake amount-rotation speed table corresponding to a set gear position of the selected intake amount-rotation speed table group is read from the ROM 10b.

Thereafter, in the step S44, whether the relationship between an acquired intake amount of the engine 5a and an acquired engine rotation speed is in an allowable region is determined with use of the read intake amount-rotation speed table.

In this manner, in the present embodiment, the allowable condition determination is carried out with use of a plurality of intake amount-rotation speed tables respectively corresponding to a plurality of control modes and a plurality of gear positions. Therefore, similarly to the second embodiment, the steerability of the motorcycle 100 in accordance with the preference of the rider can be realized, and opportunities to execute the catalyst degradation determining work can be ensured appropriately while the influence on the riding comfort is suppressed.

In the catalyst degradation determining process of FIG. 12, the steps S42 and S43 may be executed in the reverse order. Further, the step S42 may be executed after the step S44. While the motorcycle 100 is configured to be workable in the first, second and third control modes in the present embodiment, the motorcycle 100 may be configured to be workable in 2, 4 or more than 4 control modes. In this case, the gear position-traveling speed table groups corresponding to a plurality of control modes that are workable in the motorcycle 100 are stored in the ROM 10b.

5. Other Embodiments (1) While an allowable range of a traveling speed, or presence or absence of the allowable range of the traveling speed is defined in regard to all of the first to sixth gear positions except for the neutral position in the first and second embodiments, the present invention is not limited to this. In regard to two or more than two gear positions, that are only part of the first to sixth gear positions, an allowable range of a traveling speed or presence or absence of the allowable range of the traveling speed may be defined.

(2) While an allowable region, or presence or absence of the allowable region is defined in regard to all of the first to sixth gear positions except for the neutral position in the third and fourth embodiments, the present invention is not limited to this. In regard to two or more than two gear positions, that are only part of the first to sixth gear positions, an allowable region, or presence or absence of the allowable region may be defined.

Further, an allowable region, or presence or presence of the allowable region may be defined in regard to the neutral position. In this case, it is possible to carry out the allowable condition determination with the motorcycle 100 stopped by satisfaction of the other allowable conditions.

(3) While the plurality of gear position-traveling speed tables are stored in the ROM 10b to respectively correspond to all of the control modes of the motorcycle 100 in the second embodiment, the present invention is not limited to this. A plurality of gear position-traveling speed tables may be stored in the ROM 10b to respectively correspond to two or more control modes, that are only part or all of the control modes of the motorcycle 100.

(4) While the plurality of gear position-traveling speed table groups are stored in the ROM 10b to respectively correspond to all of the control modes of the motorcycle 100 in the fourth embodiments, the present invention is not limited to this. A plurality of gear position-traveling speed table groups may be stored in the ROM 10b to respectively correspond to two or more than two control modes, that are only part or all of the control modes of the motorcycle 100.

(5) In the catalyst degradation determining process according to the first to fourth embodiments, a plurality of running states may be acquired again during the catalyst degradation determination (steps S16, S27, S36 and S46). In this case, in a case where a plurality of acquired running states do not satisfy the other allowable conditions, the catalyst degradation determining work may be stopped.

(6) The output controller 16 according to the first to fourth embodiments may display a message or the like indicating that the catalyst degradation determining work is being executed in the display of the meter unit 4m during the catalyst degradation determining work.

(7) The output controller 16 according to the first to fourth embodiments may display a message or the like indicating that the catalyst degradation determining work is allowed in the display of the meter unit 4m in a case where the catalyst degradation determining work is allowed.

(8) While the running state acquirer 11 according to the first to fourth embodiments acquire a plurality of running states by receiving the output from various sensors (SE1 to SE8), the present invention is not limited to this. The running state acquirer 11 may acquire information input by the rider or the like when he or she operates the input device as running information instead of output signals from the various sensors (SE1 to SE8).

(9) The motorcycle 100 according to the second and fourth embodiments can work in the first to third control modes. The first to third control modes are modes for gradually changing the responsiveness of the vehicle. The work of the throttle actuator 63 is controlled based on the throttle control information corresponding to a selected control mode, whereby responsiveness of the vehicle in the selected control mode is realized.

However, responsivenesses of the vehicle in the first to third control modes may be realized based on information other than the throttle control information. For example, in the motorcycle 100, a plurality of ignition maps (information representing the predetermined relationship among an engine rotation speed, a throttle opening and an ignition time) respectively corresponding to the first to third control modes may be defined. In this case, the responsiveness of the vehicle in a selected control mode is realized by control of an ignition time based on the ignition map corresponding to the selected control mode.

(10) While the motorcycle 100 according to the second and fourth embodiments are workable in the first to third control modes (three types of control modes), the present invention is not limited to this. The motorcycle 100 according to the second and fourth embodiments may be configured to be workable in four or more than four control modes. For example, the motorcycle 100 may be configured to be workable in first, second, third, fourth and fifth control modes in which an opening of the throttle valve 62 changes with respect to an operation of the accelerator grip 4g with the first, second, third, fourth and fifth responsivenesses. Further, it may be defined that the levels of the first, second, third, fourth and fifth responsivenesses are lowered in this order. In this case, the rider can obtain desirable riding comfort by selecting a control mode in accordance with his or her preference.

(11) While the three-way catalyst 53 is used as the configuration for cleaning an exhaust gas in the first to fourth embodiments, the present invention is not limited to this. The three-way catalyst 53 may be replaced with an oxidation catalyst or a reduction catalyst, for example.

(12) While the above-mentioned embodiment is an example in which the present invention is applied to the motorcycle, the present invention is not limited to this. The present invention may be applied to another straddled vehicle such as a four-wheeled automobile, a motor tricycle or an ATV (All Terrain Vehicle).

6. Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the engine 5a is an example of an engine, the transmission 5b is an example of a transmission, the three-way catalyst 53 is an example of a catalyst, the motorcycle 100 is an example of a straddled vehicle, and the configuration including the ECU 10, the throttle sensor SE1, the intake pressure sensor SE2, the upstream oxygen sensor SE3, the downstream oxygen sensor SE4, the crank sensor SE5, the shift cam sensor SE6, the wheel speed sensor SE7, the accelerator sensor SE8 and the alarm light AL is an example of a catalyst degradation determining device.

Further, the running state acquirer 11 is an example of a running state acquirer, the state determiner 13 is an example of a state determiner, the determination executor 14 is an example of a determination executor, the accelerator grip 4g is an example of an accelerator grip, the throttle valve 62 is an example of a throttle valve, and the alarm light AL of the meter unit 4m is an example of an outputter.

As each of constituent elements recited in the claims, various other constituent elements having configurations or functions described in the claims can be also used.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A catalyst deterioration determining device for use in a straddled vehicle having
   an engine,
   a transmission that transmits motive power of the engine, and
   a catalyst that cleans an exhaust gas from the engine, the catalyst deterioration determining device comprising:
   a running state acquirer that acquires a plurality of running states, which include an acquired value of each of
      one of a plurality of gear ratios of the transmission,
      an intake state of the engine, and
      a rotation speed of the engine;
   a state determiner that
      stores a plurality of allowable conditions, each of which is a condition for determining work in regard to a degradation state of the catalyst to be executed and is based on a relationship among the plurality of gear ratios of the transmission, the intake state of the engine and the rotation speed of the engine, and
      determines whether the plurality of running states acquired by the running state acquirer satisfy the plurality of allowable conditions; and
   a determination executor that
      executes the determining work in regard to the degradation state in a case where the plurality of running states acquired by the running state acquirer satisfy the plurality of allowable conditions, and
      does not execute determining work in regard to the degradation state in a case where the plurality of running states acquired by the running state acquirer do not satisfy the plurality of allowable conditions.

2. The catalyst degradation determining device according to claim 1, wherein
   the plurality of running states further include an acquired value of a traveling speed of the straddled vehicle,
   the plurality of allowable conditions include
      an allowable range of the traveling speed in regard to each of the plurality of gear ratios of the transmission, and
      an allowable region in regard to an engine state, which is a relationship between the intake state of the engine and the rotation speed of the engine, and
   the state determiner
      determines that the plurality of running states satisfy the plurality of allowable conditions when
         the acquired value of the traveling speed is in the allowable range corresponding to the acquired value of the one gear ratio, and
         an acquired engine state, which is the engine state according to the acquired value of the intake state of the engine and the acquired value of the rotation speed of the engine, is in the allowable region, and
      determines that the plurality of running states do not satisfy the plurality of allowable conditions when
         the acquired value of the traveling speed is not in the allowable range corresponding to the acquired value of the one gear ratio, or
         the acquired engine state is not in the allowable region.

3. The catalyst degradation determining device according to claim 2, wherein
   the allowable range increases as each of the plurality of gear ratios decreases.

4. The catalyst degradation determining device according to claim 1, wherein
   the plurality of allowable conditions include an allowable region in regard to each of the plurality of gear ratios of the transmission and in regard to an engine state, the engine state being a relationship between the intake state of the engine and the rotation speed of the engine, and
   the state determiner
      determines that the plurality of running states satisfy the plurality of allowable conditions when an acquired engine state, which is the engine state according to the acquired value of the intake state of the engine and the acquired value of the rotation speed of the engine, is in the allowable region corresponding to the acquired value of the one gear ratio, and
      determines that the plurality of running states do not satisfy the plurality of allowable conditions when the acquired engine state is not in the allowable region corresponding to the acquired value of the one gear ratio.

5. The catalyst degradation determining device according to claim 1, wherein
   the straddled vehicle has an accelerator grip and a throttle valve, and is configured to operate in
      a first control mode in which an opening of the throttle valve changes with respect to an operation of the accelerator grip with a first responsiveness, and
      a second control mode in which the opening of the throttle valve changes with respect to the operation of the accelerator grip with a second responsiveness lower than the first responsiveness,
   the plurality of allowable conditions include first and second allowable conditions respectively corresponding to the first and second control modes, and
   the state determiner
      determines whether the plurality of running states acquired by the running state acquirer satisfy the first allowable conditions in a case where the straddled vehicle is working in the first control mode, and
      determines whether the plurality of running states acquired by the running state acquirer satisfy the second allowable conditions in a case where the straddled vehicle is working in the second control mode.

6. The catalyst degradation determining device according to claim 1, further comprising
   an outputter that outputs a result of determination obtained by the execution of the determining work.

7. A straddled vehicle comprising:
   an engine;
   a transmission that transmits motive power of the engine;
   a catalyst that cleans an exhaust gas from the engine; and the catalyst degradation determining device according to claim 1.

* * * * *